US010465965B2

(12) United States Patent
Yamakawa et al.

(10) Patent No.: US 10,465,965 B2
(45) Date of Patent: Nov. 5, 2019

(54) HEAT PUMP APPARATUS, AND AIR CONDITIONER, HEAT PUMP WATER HEATER, AND REFRIGERATOR INCLUDING THE HEAT PUMP APPARATUS

(71) Applicant: Mitsubishi Electric Corporation, Tokyo (JP)

(72) Inventors: Takashi Yamakawa, Tokyo (JP); Kazunori Hatakeyama, Tokyo (JP); Takuya Shimomugi, Tokyo (JP); Yosuke Shinomoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 284 days.

(21) Appl. No.: 15/518,649

(22) PCT Filed: Nov. 4, 2014

(86) PCT No.: PCT/JP2014/079270
§ 371 (c)(1),
(2) Date: Apr. 12, 2017

(87) PCT Pub. No.: WO2016/071965
PCT Pub. Date: May 12, 2016

(65) Prior Publication Data
US 2017/0241691 A1    Aug. 24, 2017

(51) Int. Cl.
*F25B 49/02* (2006.01)
*F04B 49/10* (2006.01)
(Continued)

(52) U.S. Cl.
CPC ............ *F25B 49/025* (2013.01); *F04B 35/04* (2013.01); *F04B 49/06* (2013.01); *F04B 49/065* (2013.01);
(Continued)

(58) Field of Classification Search
CPC ..................................................... F25B 49/025
(Continued)

(56) References Cited

U.S. PATENT DOCUMENTS

| 5,230,222 | A | * | 7/1993 | Erbs | ...................... | F25B 31/002 62/192 |
| 8,270,191 | B2 | | 9/2012 | Zhu et al. | | |

(Continued)

FOREIGN PATENT DOCUMENTS

| CN | 102545671 A | 7/2012 |
| CN | 103138596 A | 6/2013 |

(Continued)

OTHER PUBLICATIONS

International Search Report of the International Searching Authority dated Jan. 27, 2015 for the corresponding International application No. PCT/JP2014/079270 (and English translation).

(Continued)

*Primary Examiner* — David Luo
(74) *Attorney, Agent, or Firm* — Posz Law Group, PLC

(57) ABSTRACT

A heat pump apparatus includes a compressor compressing a refrigerant, a motor driving the compressor, an inverter device, and an inverter control unit controlling the inverter device. The inverter device includes the same number of bridge circuits as those of phases of the motor, and each of the bridge circuits includes plural pairs of series-connected switching elements. The pairs of switching elements are connected in parallel. The inverter device applies to the motor a high-frequency voltage of a frequency at which the motor does not rotate.

7 Claims, 16 Drawing Sheets

(51) Int. Cl.
    *H02P 27/06* (2006.01)
    *F04B 35/04* (2006.01)
    *F04B 49/06* (2006.01)
    *F25B 13/00* (2006.01)
    *F25B 30/02* (2006.01)
    *H02P 27/08* (2006.01)

(52) U.S. Cl.
    CPC .............. *F04B 49/10* (2013.01); *F25B 13/00* (2013.01); *F25B 30/02* (2013.01); *H02P 27/06* (2013.01); *H02P 27/08* (2013.01); *F25B 2600/021* (2013.01); *Y02B 30/741* (2013.01)

(58) Field of Classification Search
    USPC .......................................... 318/473, 471, 445
    See application file for complete search history.

(56) References Cited

U.S. PATENT DOCUMENTS

| | | | | |
|---|---|---|---|---|
| 8,421,386 | B2* | 4/2013 | Takahashi | ............... H02P 23/14 |
| | | | | 318/400.02 |
| 9,077,274 | B2* | 7/2015 | Shinomoto | ........... F25B 49/025 |
| 9,231,513 | B2 | 1/2016 | Baba et al. | |
| 2012/0111043 | A1 | 5/2012 | Hatakeyama et al. | |
| 2013/0133358 | A1 | 5/2013 | Ito | |

FOREIGN PATENT DOCUMENTS

| | | |
|---|---|---|
| EP | 1 863 156 A1 | 12/2007 |
| JP | 2004-135437 A | 4/2004 |
| JP | 2009-261106 A | 11/2009 |
| JP | 2010-161846 A | 7/2010 |
| JP | 2010-226899 A | 10/2010 |
| JP | 2011-038689 A | 2/2011 |
| JP | 2013-115855 A | 6/2013 |
| JP | 2013-207821 A | 10/2013 |
| WO | 2006103721 A1 | 10/2006 |
| WO | 2012/107987 A1 | 8/2012 |

OTHER PUBLICATIONS

Office action dated Apr. 24, 2018 issued in corresponding JP patent application No. 2016-557379 (and English translation thereof).
Office Action dated Oct. 17, 2017 corresponding to JP patent application No. 2016-557379 (and partial English translation attached).
Office Action dated Feb. 22, 2019 issued in corresponding CN patent application No. 201480083005.3 (and English translation).
Office Action dated Sep. 24, 2019 issued in corresponding JP patent application No. 2016-557379 (and English tanslation).

* cited by examiner

FIG.6

| VOLTAGE VECTOR | VOLTAGE DIRECTION | UP | VP | WP | UN | VN | WN |
|---|---|---|---|---|---|---|---|
| V0 | 0 | 0 | 0 | 0 | 1 | 1 | 1 |
| V1 | +W | 0 | 0 | 1 | 1 | 1 | 0 |
| V2 | +V | 0 | 1 | 0 | 1 | 0 | 1 |
| V3 | -U | 0 | 1 | 1 | 1 | 0 | 0 |
| V4 | +U | 1 | 0 | 0 | 0 | 1 | 1 |
| V5 | -V | 1 | 0 | 1 | 0 | 1 | 0 |
| V6 | -W | 1 | 1 | 0 | 0 | 0 | 1 |
| V7 | 0 | 1 | 1 | 1 | 0 | 0 | 0 |

HEAT PUMP APPARATUS, AND AIR CONDITIONER, HEAT PUMP WATER HEATER, AND REFRIGERATOR INCLUDING THE HEAT PUMP APPARATUS

CROSS REFERENCE TO RELATED APPLICATION

This application is a U.S. national stage application of International Patent Application No. PCT/JP2014/079270 filed on Nov. 4, 2014, the disclosure of which is incorporated herein by reference.

TECHNICAL FIELD

The present invention relates to a heat pump apparatus for controlling heating of a compressor, and relates to an air conditioner, a heat pump water heater, and a refrigerator including the heat pump apparatus.

BACKGROUND

Patent Literature 1 listed below discloses a technique applying to a compressor a high-frequency voltage of a frequency higher than a frequency at which an inverter drives the compressor, such that the compressor is heated at the high-frequency voltage (hereinafter referred to as "high-frequency heating") to eliminate refrigerant retention (so-called "stagnation") in the compressor.

A plurality of switching elements are installed in the inverter. When the switching elements are mounted as chips, the larger chip area reduces the yield. The smaller chip area improves the yield in the removal from the wafer, thereby achieving the price reduction.

PATENT LITERATURE

International Publication No. WO2012/107987

According to the conventional technique, when the switching elements are mounted as the chips, the smaller chip area achieves reduction in the inverter price. Meantime, the smaller chip area reduces the current capacity. Thus, the problem with an inverter for driving a compressor is that it is difficult to achieve both the price reduction and the increase in current capacity which has a trade-off relation with the price reduction.

It is expected that the high-frequency heating technique disclosed in Patent Literature 1 is not merely applicable when the switching elements of the small chip area are used. This is because the inverter for driving the compressor disclosed in Patent Literature 1 is premised on the use of the switching elements of the considerable current capacity ensured, that is, the switching elements of the large chip area.

SUMMARY

The present invention has been achieved in view of the foregoing, and an object of the present invention is to provide a heat pump apparatus capable of performing a high-frequency heating on a compressor driven by an inverter configured to use switching elements of a small chip area. Another object of the present invention is to provide an air conditioner, a heat pump water heater, and a refrigerator including the heat pump apparatus.

To solve the above problem and achieve the object, the present invention provides a heat pump apparatus comprising: a compressor compressing a refrigerant; a motor driving the compressor; an inverter including a bridge circuit equal in number to a phase of the motor, the bridge circuit including plural pairs of switching elements connected in series, the plural pairs of switching elements being connected in parallel, the inverter applying to the motor a high-frequency voltage of a frequency at which the motor does not rotate; and an inverter control unit controlling the inverter.

The present invention achieves an effect of performing the high-frequency heating on the compressor driven by the inverter configured to use the switching elements of the small chip area.

BRIEF DESCRIPTION OF DRAWINGS

FIG. 6 is a diagram illustrating eight kinds of voltage vectors to be applied to the inverter device, and switching patterns to output these voltage vectors.

DETAILED DESCRIPTION

A heat pump apparatus, an air conditioner, a heat pump water heater, and a refrigerator including the heat pump apparatus according to embodiments of the present invention will be described below in detail with reference to the accompanying drawings. The present invention is not limited to the following embodiments.

First Embodiment

Figure 1:
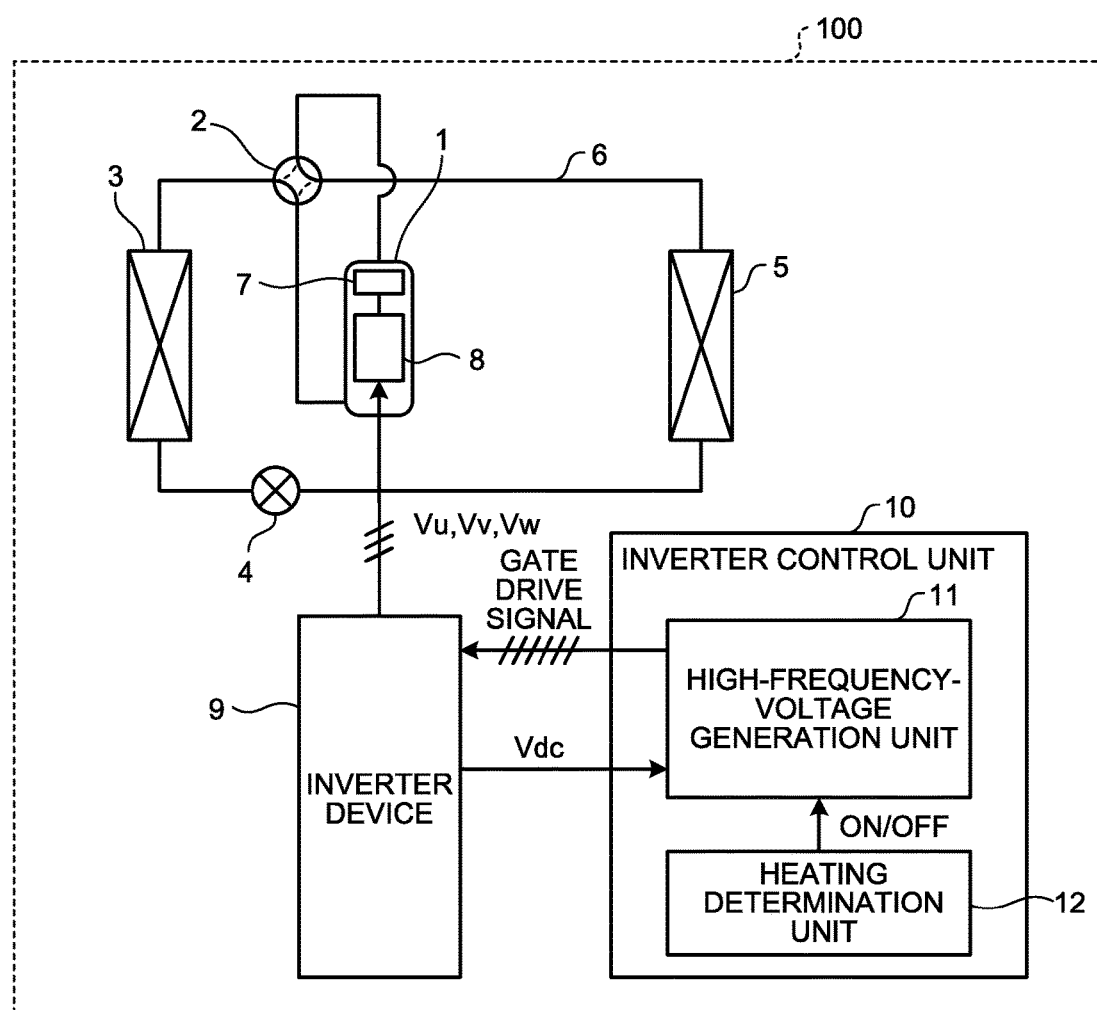
FIG. 1 is a diagram illustrating a configuration example of a heat pump apparatus according to a first embodiment.

FIG. 1 is a diagram illustrating a configuration example of a heat pump apparatus 100 according to a first embodiment. The heat pump apparatus 100 in the first embodiment includes a refrigeration cycle in which a compressor 1, a four-way valve 2, a heat exchanger 3, an expansion mechanism 4, and a heat exchanger 5 are sequentially connected via a refrigerant pipe 6. A compression mechanism 7 for compressing a refrigerant, and a motor 8 for operating this compression mechanism 7 are provided in the compressor 1. The motor 8 is a three-phase motor including windings of three phases that are a U-phase, a V-phase, and a W-phase.

An inverter device 9 for applying a voltage to the motor 8 to drive the motor 8 is electrically connected to the motor 8. The inverter device 9 applies voltages Vu, Vv, and Vw to the U-phase winding, the V-phase winding, and the W-phase winding of the motor 8, respectively.

The inverter device 9 is electrically connected to an inverter control unit 10 including a heating determination unit 12 determining whether the motor 8 needs to be heated, and a high-frequency-voltage generation unit 11 for performing control over application of a high-frequency voltage to the motor 8.

The inverter control unit 10 controls the inverter device 9 to operate either in a compressing-operation mode causing the compressor 1 to compress a refrigerant, or in a heating-operation mode heating the compressor 1. When the inverter device 9 operates in the compressing-operation mode, the inverter control unit 10 causes the inverter device 9 to generate an AC voltage with a frequency at which the motor 8 rotates. When the inverter device 9 operates in the heating-operation mode, the inverter control unit 10 causes the inverter device 9 to generate a high-frequency voltage that is an AC voltage of a frequency at which the motor 8 does not rotate, the frequency of the high-frequency voltage being higher than the frequency of the AC voltage generated in the compressing-operation mode.

A bus voltage Vdc that is a power supply voltage of the inverter device 9 is transmitted from the inverter device 9 to the high-frequency-voltage generation unit 11. When the heating determination unit 12 determines that the motor 8 needs to be heated, the heating determination unit 12 outputs an ON signal to the high-frequency-voltage generation unit 11. When the heating determination unit 12 does not determine that the motor 8 needs to be heated, the heating determination unit 12 outputs an OFF signal to the high-frequency-voltage generation unit 11. When the ON signal is output from the heating determination unit 12, the high-frequency-voltage generation unit 11 generates a gate drive signal for applying a high-frequency voltage to the motor 8 on a basis of the input bus voltage Vdc, and outputs the generated gate drive signal to the inverter device 9.

Figure 2:
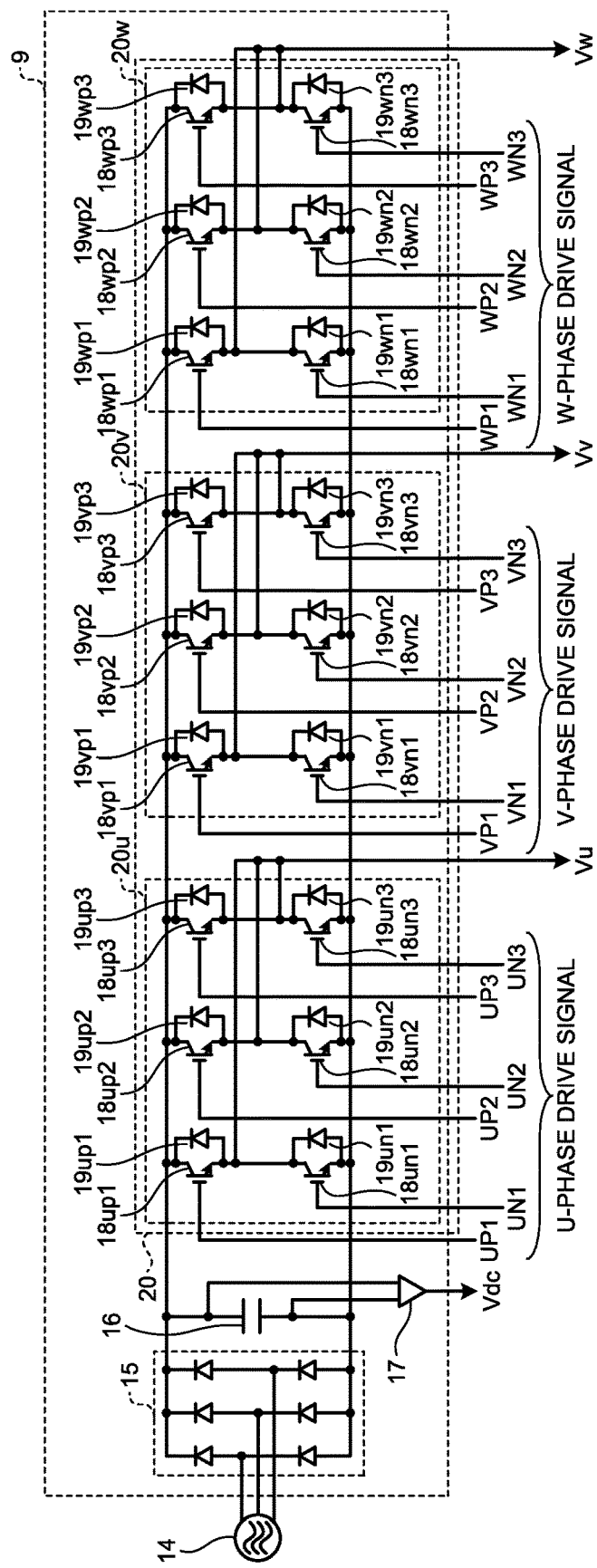
FIG. 2 is a diagram illustrating a configuration example of an inverter device according to the first embodiment.

FIG. 2 is a diagram illustrating a configuration example of the inverter device 9 according to the first embodiment. The inverter device 9 includes a rectifier 15, a smoothing capacitor 16, a voltage detection unit 17, and an inverter 20. The rectifier rectifies a voltage applied from an AC power supply 14. The smoothing capacitor 16 smoothes a voltage rectified by the rectifier 15 to generate a DC voltage. The voltage detection unit 17 detects a DC voltage Vdc generated by the smoothing capacitor 16, and outputs the DC voltage Vdc to the inverter control unit 10. The inverter 20 operates using the DC voltage Vdc as a power supply voltage. The inverter 20 is configured to be divided into a U-phase inverter $20u$, a V-phase inverter $20v$, and a W-phase inverter $20w$. The DC voltage Vdc to be detected by the voltage detection unit 17 is equivalent to a bus voltage to be applied to the inverter 20, and is therefore described below as "bus voltage Vdc".

The U-phase inverter $20u$ provides a U-phase bridge circuit having three parallel-connected pairs of switching elements. Three pairs of switching elements are a set of switching elements $18up1$ and $18un1$, a set of switching elements $18up2$ and $18un2$, and a set of switching elements $18up3$ and $18un3$. Each switching-element pair is constituted by two switching elements connected in series (the switching element illustrated as an example in FIG. 2 is an insulated gate bipolar transistors (IGBTs)). The circuit unit constituted by a pair of switching elements is referred to as "arm". The switching element on the high-voltage side located on the upper side of the circuit unit is referred to as "upper arm". The switching element on the low-voltage side located on the lower side of the circuit unit is referred to as "lower arm".

In the U-phase bridge circuit, a connection point between the switching elements $18up1$ and $18un1$, a connection point between the switching elements $18up2$ and $18un2$, and a connection point between the switching elements $18up3$ and $18un3$ are led out and electrically connected to each other to constitute a U-phase AC terminal. The switching elements $18up1$, $18up2$, $18up3$, $18un1$, $18un2$, and $18un3$ are provided respectively with freewheeling diodes $19up1$, $19up2$, $19up3$, $19un1$, $19un2$, and $19un3$, each of which is connected in inverse parallel, that is, in such a manner that a current flows in the reverse direction.

The V-phase inverter $20v$ and the W-phase inverter $20w$ are also configured in the same manner as the U-phase inverter $20u$. As described below in the same manner as the U-phase inverter $20u$, the V-phase inverter $20v$ provides a V-phase bridge circuit having three parallel-connected pairs of switching elements. Three pairs of switching elements are a set of switching elements $18vp1$ and $18vn1$, a set of switching elements $18vp2$ and $18vn2$, and a set of switching elements $18vp3$ and $18vn3$. In the V-phase bridge circuit, a connection point between the switching elements $18vp1$ and $18vn1$, a connection point between the switching elements $18vp2$ and $18vn2$, and a connection point between the switching elements $18vp3$ and $18vn3$ are led out and electrically connected to each other to constitute a V-phase AC terminal. The switching elements $18vp1$, $18vp2$, $18vp3$, $18vn1$, $18vn2$, and $18vn3$ are provided respectively with freewheeling diodes $19vp1$, $19vp2$, $19vp3$, $19vn1$, $19vn2$, and $19vn3$, each of which is connected in inverse parallel.

The W-phase inverter $20w$ provides a W-phase bridge circuit having which three parallel-connected pairs of switching elements. The three pairs of switching elements are a set of switching elements $18wp1$ and $18wn1$, a set of switching elements $18wp2$ and $18wn2$, and a set of switching elements $18wp3$ and $18wn3$. In the W-phase bridge circuit, a connection point between the switching elements $18wp1$ and 18wn1, a connection point between the switching elements 18wp2 and 18wn2, and a connection point between the switching elements 18wp3 and 18wn3 are led out and electrically connected to each other to constitute a W-phase AC terminal. The switching elements 18wp1, 18wp2, 18wp3, 18wn1, 18wn2, and 18wn3 are provided respectively with freewheeling diodes 19wp1, 19wp2, 19wp3, 19wn1, 19wn2, and 19wn3, each of which is connected in inverse parallel.

U-phase drive signals UP1, UP2, UP3, UN1, UN2, and UN3 that are gate drive signals for the U-phase are input to the U-phase inverter 20u by the inverter control unit 10. The U-phase inverter 20u controls the switching element corresponding to each of these U-phase drive signals UP1, UP2, UP3, UN1, UN2, and UN3. Specifically, UP1 controls the switching element 18up1. Also, UP2 controls the switching element 18up2. UP3 controls the switching element 18up3. UN1 controls the switching element 18un1. UN2 controls the switching element 18un2. UN3 controls the switching element 18un3.

The same applies to the V-phase inverter 20v and the W-phase inverter 20w. V-phase drive signals VP1, VP2, VP3, VN1, VN2, and VN3 that are gate drive signals for the V-phase are input to the V-phase inverter 20v. W-phase drive signals WP1, WP2, WP3, WN1, WN2, and WN3 that are gate drive signals for the W-phase are input to the W-phase inverter 20w. In the V-phase inverter 20v, VP1 controls the switching element 18vp1. Also, VP2 controls the switching element 18vp2. VP3 controls the switching element 18vp3. VN1 controls the switching element 18vn1. VN2 controls the switching element 18vn2. VN3 controls the switching element 18vn3. In the W-phase inverter 20w, WP1 controls the switching element 18wp1. Also, WP2 controls the switching element 18wp2. WP3 controls the switching element 18wp3. WN1 controls the switching element 18wn1. WN2 controls the switching element 18wn2. WN3 controls the switching element 18wn3.

Due to the control described above, the voltages Vu, Vv, and Vw are output from the U-phase inverter 20u, the V-phase inverter 20v, and the W-phase inverter 20w, respectively, through their ON-controlled switching elements. These voltages Vu, Vv, and Vw are then applied to the respective U-phase, V-phase, and W-phase windings of the motor 8.

In the manner as described above, the inverter 20 according to the first embodiment is configured by connecting the switching elements in parallel. For example, in the U-phase inverter 20u, although the switching elements 18up1, 18up2, and 18up3 constituting the upper arms, and the switching elements 18un1, 18un2, and 18un3 constituting the lower arms have their respective low current capacities, a large current capacity can be achieved because a set of the switching elements 18up1 and 18un1, a set of the switching elements 18up2 and 18un2, and a set of the switching elements 18up3 and 18un3 are connected in parallel. As described in the section of Background, decreasing the current capacity decreases the chip area, thereby improving the yield of the chips removed from the wafer.

It is effective to modularize each of the U-phase inverter 20u, the V-phase inverter 20v, and the W-phase inverter 20w. Each of the U-phase inverter 20u, the V-phase inverter 20v, and the W-phase inverter 20w has the same circuit configuration as a single module for three phases that is commonly used. Therefore, each inverter, which can use the conventional module structure directly or with simple changes, is easy to design. Further, using the conventional module structure can manufacture the inverter at the reduced costs.

Figure 3:
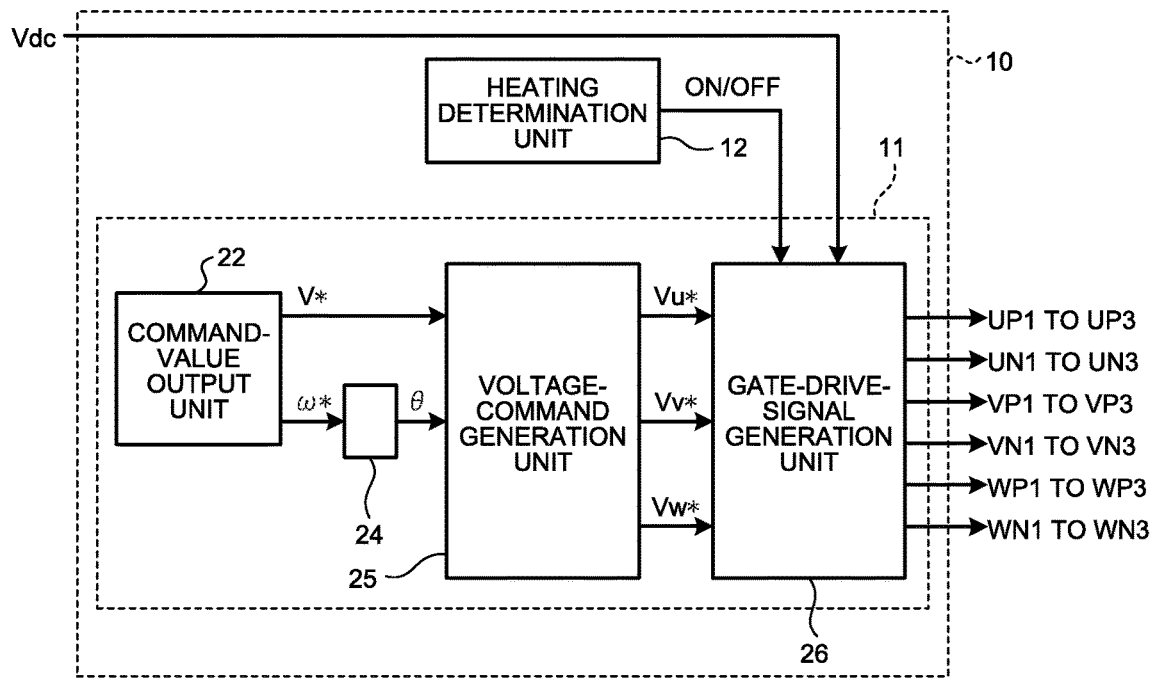
FIG. 3 is a diagram illustrating a configuration example of an inverter control unit according to the first embodiment.

FIG. 3 is a diagram illustrating a configuration example of the inverter control unit 10 according to the first embodiment. As described above, the inverter control unit 10 includes the high-frequency-voltage generation unit 11 and the heating determination unit 12. The high-frequency-voltage generation unit 11 is first described below, as the heating determination unit 12 is discussed later.

The high-frequency-voltage generation unit 11 includes a command-value output unit 22, an integrator 24, a voltage-command generation unit 25, and a gate-drive-signal generation unit 26. The command-value output unit 22 outputs a voltage command value V* and a rotation-speed command value ω*. The integrator 24 derives a voltage phase θ from the rotation-speed command value ω* output by the command-value output unit 22. Using the inputs that are the voltage command value V* output by the command-value output unit 22, and the voltage phase θ derived by the integrator 24, the voltage-command generation unit 25 generates and outputs voltage command values Vu*, Vv*, and Vw* to the gate-drive-signal generation unit 26. On the basis of the input bus voltage Vdc and the voltage command values Vu*, Vv*, and Vw* generated by the voltage-command generation unit 25, the gate-drive-signal generation unit 26 generates the U-phase drive signals UP1, UP2, UP3, UN1, UN2, and UN3, the V-phase drive signals VP1, VP2, VP3, VN1, VN2, and VN3, and the W-phase drive signals WP1, WP2, WP3, WN1, WN2, and WN3, which have been all described above, and outputs these drive signals to the inverter 20.

In the configuration in FIG. 3, for example, the command-value output unit 22 may be configured to calculate a necessary heating amount for the heating determination unit 12, and the voltage command value V* and the rotation-speed command value ω* may be input to the command-value output unit 22. Further, in FIG. 3, the command-value output unit 22 is configured to be located inside the inverter control unit 10. It is also possible for the command-value output unit 22 to input the value from the outside of the inverter control unit 10.

Figure 4:
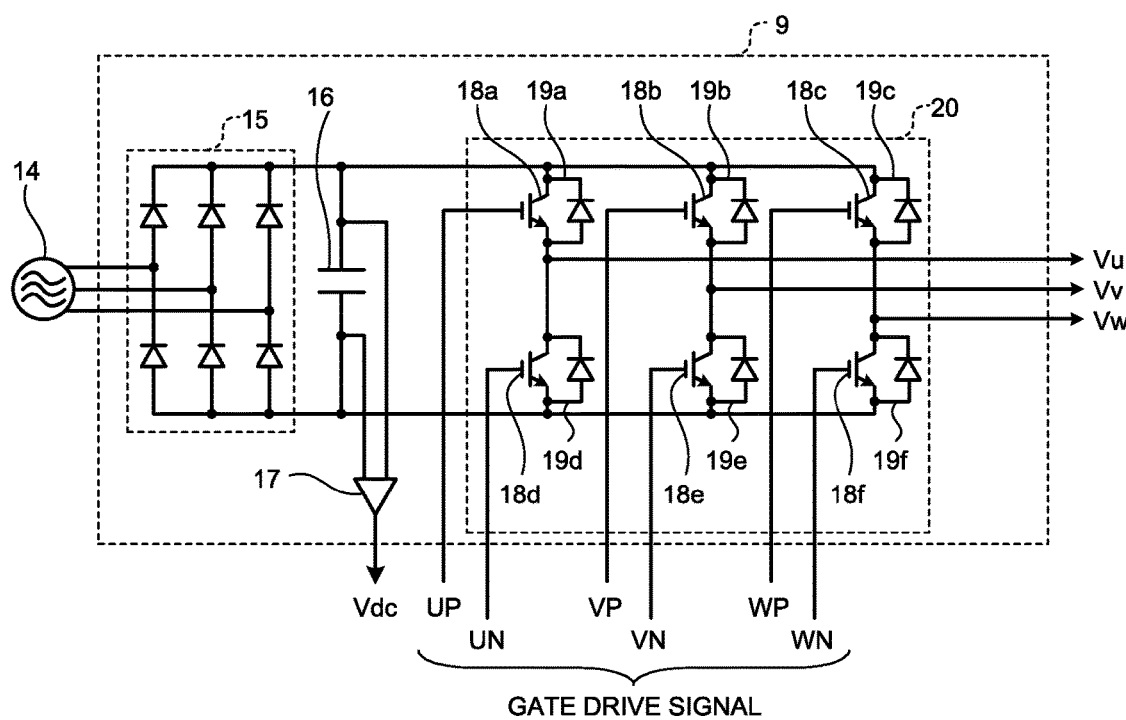
FIG. 4 is a diagram illustrating an inverter circuit of a common configuration having switching elements not connected in parallel.

Next, a voltage vector in the inverter control is described. FIG. 4 is a diagram illustrating an inverter circuit of a common configuration having switching elements not connected in parallel.

For the inverter 20 of the common configuration having the switching elements not connected in parallel, as illustrated in FIG. 4, the three pairs of switching elements, which are a set of switching elements 18a and 18d, a set of switching elements 18b and 18e, and a set of switching elements 18c and 18f, are connected in parallel. The switching elements 18a, 18b, 18c, 18d, 18e, and 18f are provided respectively with freewheeling diodes 19a, 19b, 19c, 19d, 19e, and 19f, each of which is connected in inverse parallel.

As an example, the inverter 20 of the common configuration as illustrated in FIG. 4 can be used in a domestic air conditioner with a relatively low rated current capacity. The inverter 20 of the parallel configuration as illustrated in FIG. 2 can be used in an industrial air conditioner with a relatively high rated current capacity.

Next, a discussion is made as to the switching control to drive the inverter 20 configured as illustrated in FIG. 4. First, the inverter control unit 10 generates the voltage command values Vu*, Vv*, and Vw* according to the following equations (1) to (3) to control the inverter 20.

$$Vu^* = V^* \cdot \cos\theta \quad (1)$$

$$Vv^* = V^* \cdot \cos\{\theta - (2/3)\pi\} \quad (2)$$

$$Vw^* = V^* \cdot \cos\{\theta + (2/3)\pi\} \quad (3)$$

The U-phase voltage command value Vu*, the V-phase voltage command value Vv*, and the W-phase voltage command value Vw*, which are expressed by the above equations (1) to (3), are the cosine waves with the phase shifting by $2\pi/3$ from one another, for example. In the equations (1) to (3), "V*" represents an amplitude of the voltage command value, and "θ" represents a phase of the voltage command value, which are output from the command-value output unit 22 in the configuration in FIG. 3. It is noted that a sine wave is used instead of the cosine wave.

Figure 5:
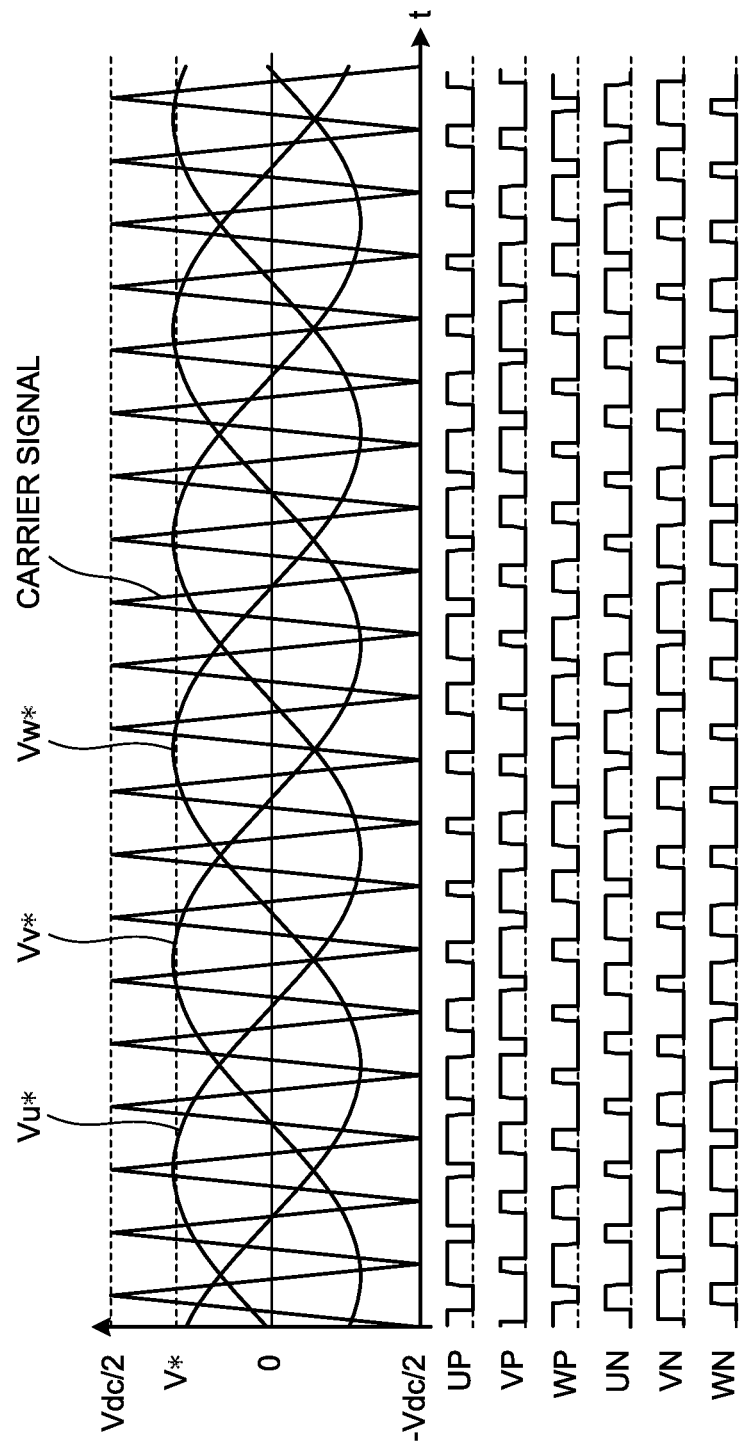
FIG. 5 is a diagram illustrating a waveform example of voltage command values and gate drive signals to execute a switching control on the inverter device illustrated in FIG. 4.

FIG. 5 is a diagram illustrating a waveform example of voltage command values and gate drive signals to execute a switching control on the inverter device illustrated in FIG. 4. The upper section of FIG. 5 illustrates a carrier signal serving as a reference signal having an amplitude of Vdc/2 and varying at a set frequency, and the U-phase voltage command value Vu*, the V-phase voltage command value Vv*, and the W-phase voltage command value Vw*, which are expressed by the above equations (1) to (3), respectively. The respective magnitudes of the U-phase voltage command value Vu*, the V-phase voltage command value Vv*, and the W-phase voltage command value Vw* are compared with the magnitude of the carrier signal. The U-phase drive signals UP and UN, the V-phase drive signals VP and VN, and the W-phase drive signals WP and WN are generated on the basis of whether the respective magnitudes of the command values are larger or smaller than the magnitude of the carrier signal. The lower section of FIG. 5 illustrates the waveforms of these U-phase drive signals UP and UN, V-phase drive signals VP and VN, and W-phase drive signals WP, WN. For example, when the U-phase voltage command value Vu* is larger than the carrier signal, a "High"-level voltage to turn the switching element 18a ON is output as UP, and a "Low"-level voltage to turn the switching element 18d OFF is output as UN. In contrast, when the U-phase voltage command value Vu* is smaller than the carrier signal, a "Low"-level voltage to turn the switching element 18a OFF is output as UP, and a "High"-level voltage to turn the switching element 18d ON is output as UN. The same applies to the other signals. VP and VN are determined on the basis of the comparison between the V-phase voltage command value Vv* and the carrier signal. WP and WN are determined on the basis of the comparison between the W-phase voltage command value Vw* and the carrier signal.

Since a common inverter employs a complementary control method, UP and UN, VP and VN, and WP and WN have an opposite relation with each other. Therefore, there are eight different switching patterns in total.

The frequency of the carrier signal illustrated in FIG. 5 is an example. It is possible to select any frequency from among the set frequencies. Also, the waveform of the carrier signal is an example. Any waveform can be used as long as a peak and a valley of the waveform can both be identified.

FIG. 6 is a diagram illustrating eight kinds of voltage vectors, and the switching patterns to output these voltage vectors. In FIG. 6, the voltage vectors to be generated in the respective switching patterns are denoted by V0 to V7. Further, the voltage direction of each voltage vector is represented by the signs "+" or "−". When no voltage is generated, the voltage direction is represented by "0". Specifically, for example, "+U" represents a voltage for generating a current in the U-phase direction. The current in the U-phase direction flows into the motor 8 through the U-phase, and then flows out from the motor 8 through the V-phase and the W-phase. Further, "−U" represents a voltage for generating a current in a direction opposite to the U-phase direction. The current in the opposite direction flows into the motor 8 through the V-phase and the W-phase, and then flows out from the motor 8 through the U-phase. It is noted that "+V", "−V", "+W", and "−W" should be construed in the same manner as described above.

The switching patterns illustrated in FIG. 6 are combined to output a voltage vector, thereby applying a desired voltage to the inverter 20. In the compressing-operation mode, the operation of compressing a refrigerant in the common compressor 1 is typically performed at 1 kHz or less.

Figure 7:
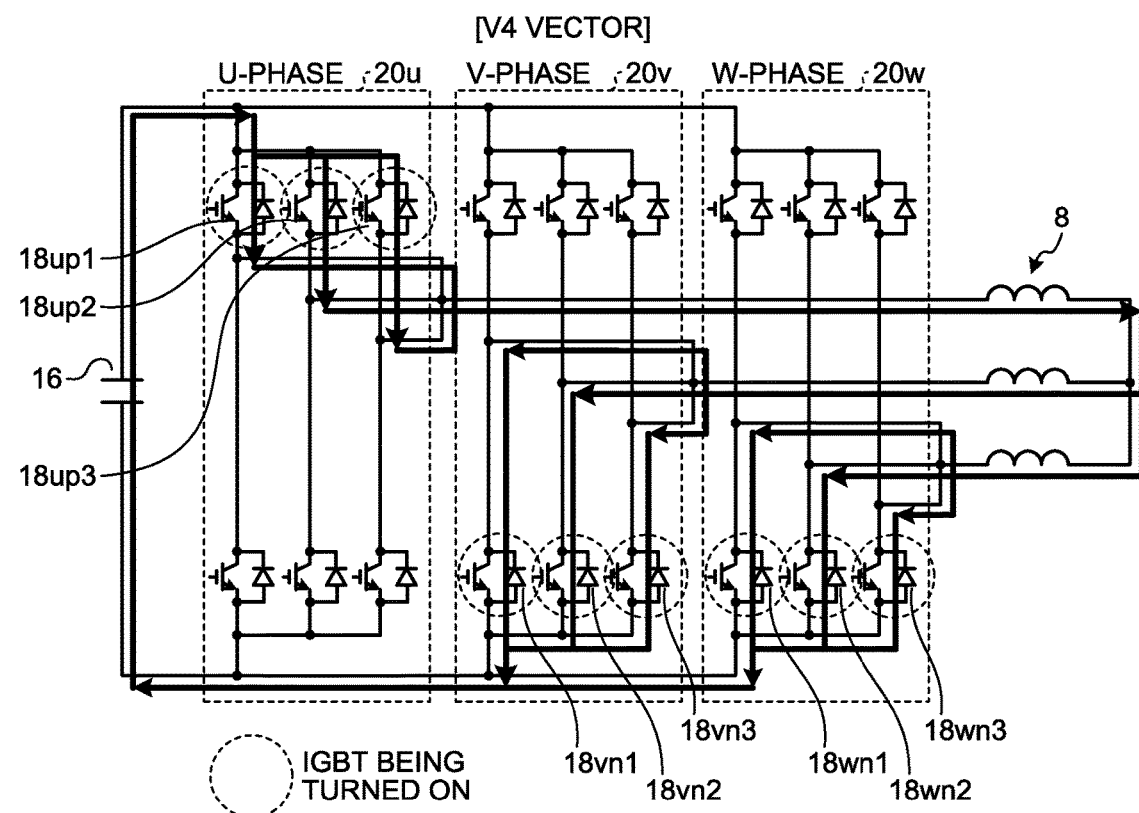
FIG. 7 is a diagram illustrating a current flow in a compressing-operation mode of the inverter device according to the first embodiment.

FIG. 7 is a diagram illustrating a current flow in the compressing-operation mode of the inverter device 9 according to the first embodiment. FIG. 7 illustrates a state in which the switching elements encircled with broken lines (in the example in FIG. 7, the switching elements 18up1, 18up2, 18up3, 18vn1, 18vn2, 18vn3, 18wn1, 18wn2, and 18wn3) are ON, and the switching elements not encircled with the broken lines are OFF. As illustrated in FIG. 7, when the inverter device 9 according to the first embodiment operates in the compressing-operation mode, all the switching elements connected in parallel are controlled to perform the ON operation. As a result of this control, the current flowing through the motor 8 is the sum of the currents flowing through the three switching elements connected in parallel, thereby ensuring the motor current necessary for the compression operation although the low-current-capacity switching elements connected in parallel are used.

FIG. 7 illustrates the mode controlling the U-phase upper arm, the V-phase lower arm, and the W-phase lower arm to be turned ON. That is, FIG. 7 illustrates an example in which the voltage vector V4 is applied to the motor. When another voltage vector illustrated in FIG. 6 is applied to the motor 8 in the compressing-operation mode, all the switching elements connected in parallel are controlled to perform the ON operation in the same manner as in FIG. 7.

Figure 8:
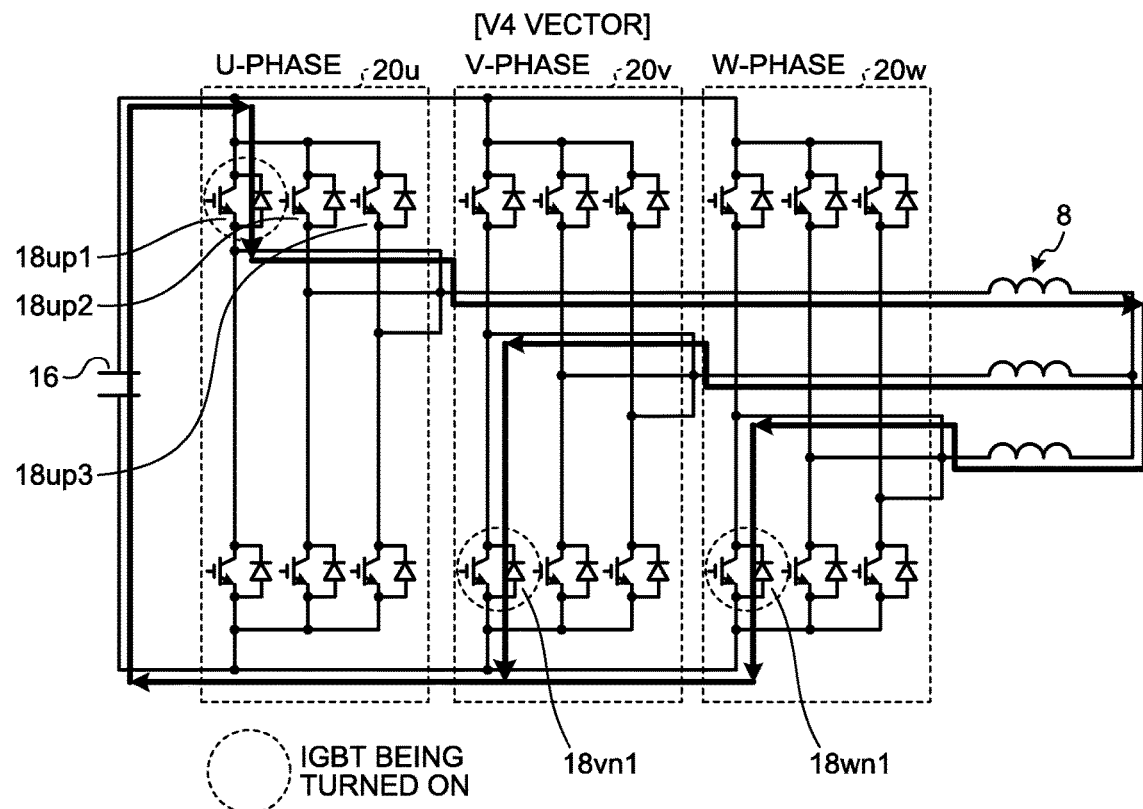
FIG. 8 is a diagram illustrating a current flow in a heating-operation mode of the inverter device according to the first embodiment.

Next, a discussion is made as to an operation of the inverter device 9 according to the first embodiment in the heating-operation mode. FIG. 8 is a diagram illustrating a current flow in the heating-operation mode of the inverter device 9 according to the first embodiment. FIG. 8 also illustrates an example in which the voltage vector V4 is applied to the motor 8 in the same manner as in FIG. 7.

FIG. 8 illustrates a state in which the switching elements encircled with broken lines (the switching elements 18up1, 18vn1, and 18wn1 in the example in FIG. 8) are ON, and the switching elements not encircled with the broken lines are OFF. As illustrated in FIG. 8, when the inverter device 9 according to the first embodiment operates in the heating-operation mode, not all the switching elements connected in parallel perform the ON operation. Instead, only one of the switching elements per phase, that is, only one of the three arms performs the ON operation.

In the heating-operation mode, the current to pass through the motor is smaller than the current for the motor 8 to perform the compressing operation. Since each switching element is designed to be driven highly efficiently within the output-current range for the motor 8 to perform the compressing operation, it is difficult for the conventional concept to enable the high efficient driving within an output-current range for the heating operation. This relationship is more significant for models having higher outputs. Meanwhile, the inverter 20 of the parallel-connection configuration as illustrated in FIG. 2 reduces the current capacity of each switching element while ensuring a current capacity per phase, thereby accommodating the difference in the output current between the compressing operation and the heating operation. This makes it possible to appropriately design not only the output-current range for the compressing operation, but also the output-current range for the heating operation.

When all the switching elements connected in parallel perform the ON operation in the heating-operation mode as illustrated in FIG. 7, a current splits into currents passing through the three respective arms; thus, the current flowing through each switching element is small. This results in failure to achieve smooth commutation of the current at the time of the ON/OFF switching during the change from a the zero vector to the real vector. This tends to cause an output-voltage distortion. In contrast, instead of the ON performance of the switching elements of all the arms connected in parallel, the ON performance of the switching element of the single arm, as illustrated in, for example, FIG. 8 suppresses a split of the current flow in each phase, thereby ensuring a current flow through the single switching element. Although in FIG. 8, only the switching element of the single arm performs the ON operation, the switching elements of the two arms (two parallel connections) among the three arms (three parallel connections) may perform the ON operation. In generic terms, the switching element of an m-arm (an "m" parallel connection) among the n-arms ("n" parallel connections) may perform the ON operation where "n" is an integer equal to or larger than 2, and "m" is an integer equal to or larger than 1 and smaller than "n". This control suppresses a split of the current flow in each phase, thereby suppressing degradation of the commutation characteristics. As a result, it is also possible to suppress the occurrence of an output-voltage distortion.

Figure 9:
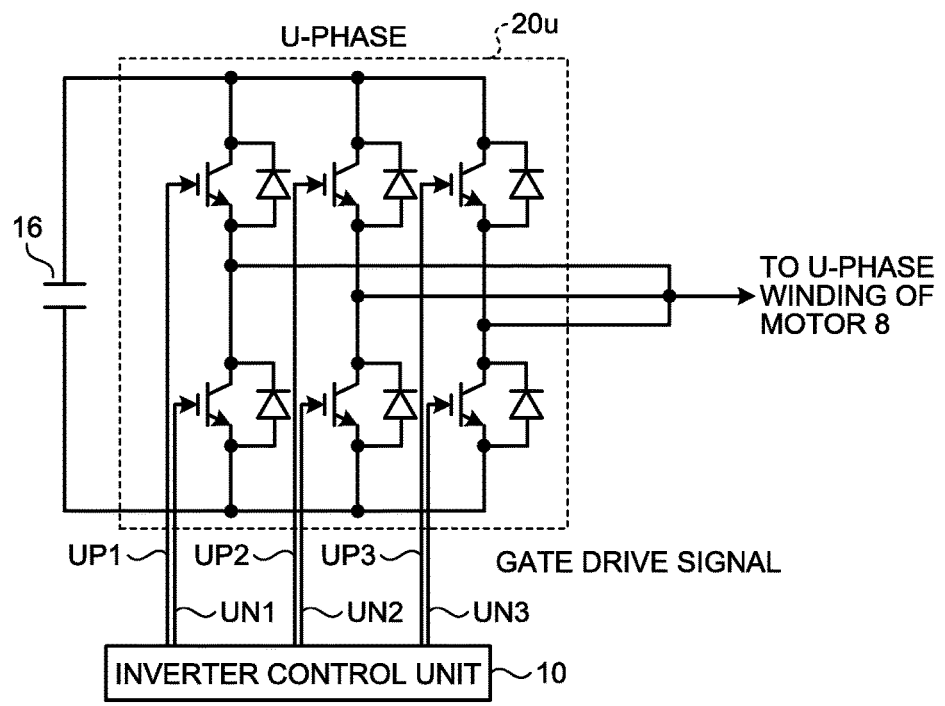
FIG. 9 is a diagram illustrating a flow of gate drive signals for controlling the inverter device according to the first embodiment.

FIG. 9 is a diagram illustrating a flow of the gate drive signals for controlling the inverter device 9 according to the first embodiment. FIG. 9 illustrates an inverter for a single phase, specifically, the U-phase inverter 20u.

Since it is necessary to control all of the non-driven arms to be turned OFF in the compressing-operation mode, as discussed above, the U-phase inverter 20u is configured to provide gate drive lines from the inverter control unit 10 to all of the switching elements, as illustrated in FIG. 9. In the configuration in FIG. 9, the six gate drive lines are needed per one phase. Thus, the eighteen gate drive lines are needed for the three phases that are the U, V, and W-phases. In this configuration, the inverter control unit 10 outputs the U-phase drive signals UP1, UP2, UP3, UN1, UN2, and UN3 to the U-phase inverter 20u. Although not illustrated, the same applies to the V-phase inverter 20v and the W-phase inverter 20w.

Figure 10:
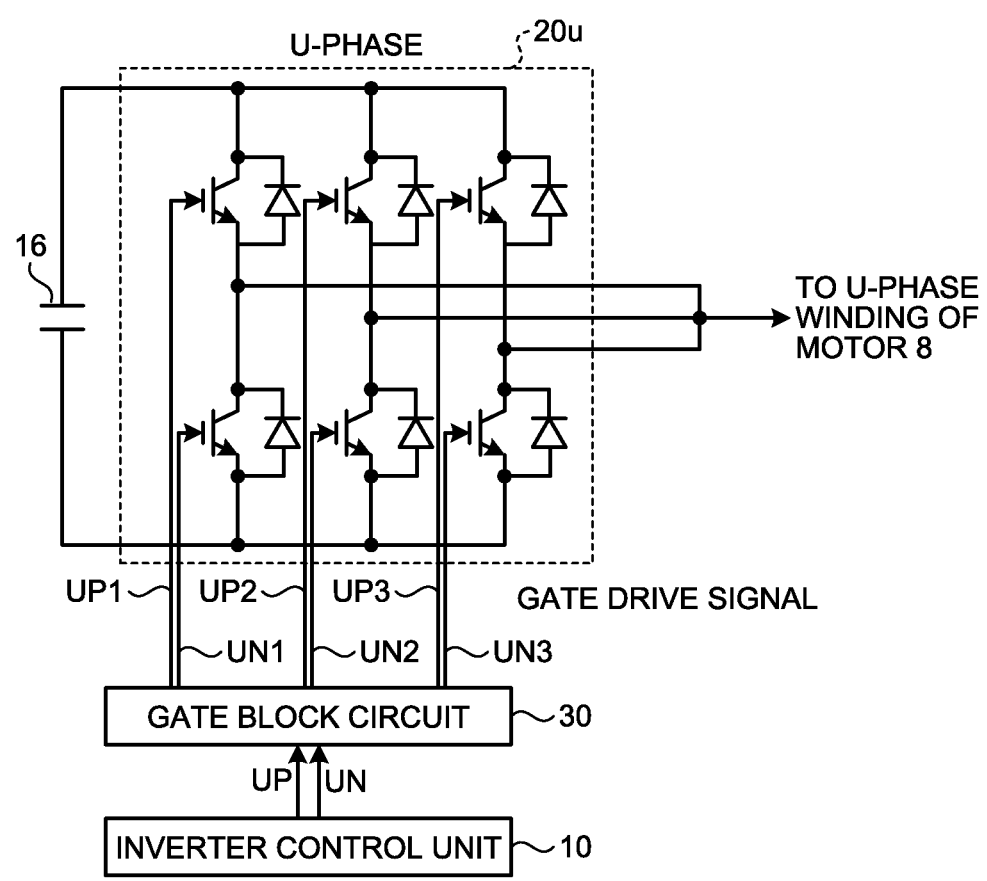
FIG. 10 is an explanatory diagram of a flow of gate drive signals for controlling the inverter device according to the first embodiment but the flow of the gate drive signals are different from that in FIG. 9.

FIG. 10 is an explanatory diagram of a flow of the gate drive signals for controlling the inverter device 9 according to the first embodiment but the flow of the gate drive signals are different from that in FIG. 9. In FIG. 10, a gate block circuit 30 is provided between the inverter device 9 and the inverter control unit 10. In the configuration of FIG. 10, the inverter control unit 10 is configured to instruct the gate block circuit 30 of only the arm that is to be turned ON. That is, the inverter control unit 10 outputs the U-phase drive signals UP and UN to the gate block circuit 30. On the basis of the U-phase drive signals UP and UN, the gate block circuit 30 outputs the U-phase drive signals UP1, UP2, UP3, UN1, UN2, and UN3 for causing three switching elements constituting the respective arms of the U-phase to perform the ON or OFF operation in the compressing-operation mode. On the basis of the U-phase drive signals UP and UN, the gate block circuit 30 outputs the U-phase drive signals UP1, UP2, UP3, UN1, UN2, and UN3 for causing one of the three switching elements constituting the respective arms of the U-phase to perform the ON operation in the heating-operation mode. Providing the gate block circuit 30 enables the inverter control unit 10 to use the same interface as that used in controlling an inverter of a common configuration. Further, the inverter control unit 10 can use the conventional drive-signal output port. This makes it possible to suppress a cost increase.

In the above example according to the first embodiment, an inverter circuit for the single phase is configured by three pairs of switching elements. However, the inverter-circuit configuration is not limited to the above example. The inverter circuit for the single phase may be configured by plural (two, or four or more) pairs of switching elements. Further, in the above example according to the first embodiment, the motor 8 is a three-phase motor. However, the motor 8 is not limited to the three-phase motor, and it is also possible to use a polyphase motor. In that case, it is noted that the same number of the inverter circuits as that of the phases is configured.

Figure 11:
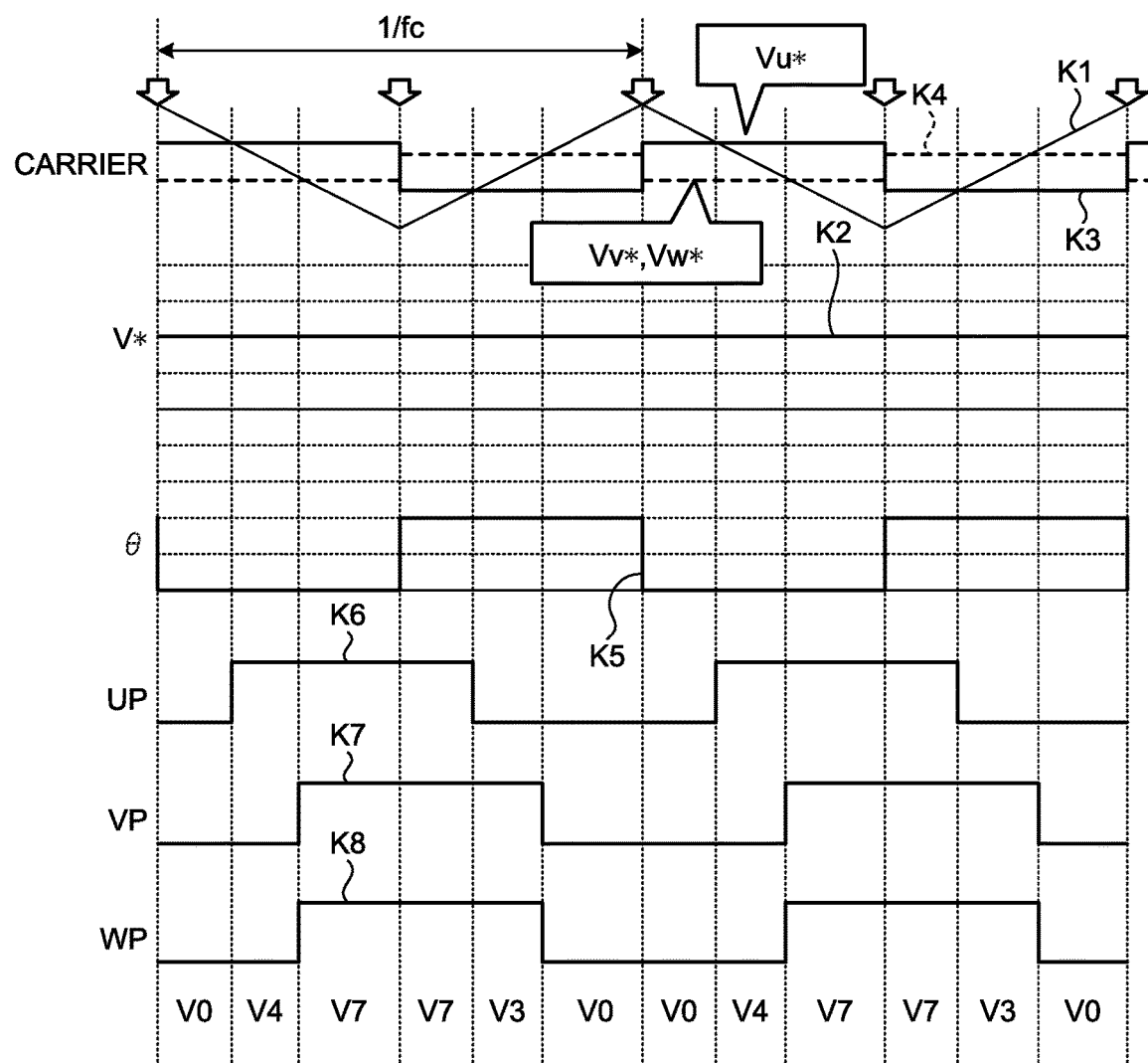
FIG. 11 is a timing chart for explaining voltage-vector transition during a heating operation on the inverter device according to the first embodiment.

Next, a discussion is made as to the transition in voltage-vector in the heating-operation mode. FIG. 11 is a timing chart for explaining the voltage-vector transition in the heating-operation mode.

In FIG. 11, fc represents a frequency of the carrier signal. Therefore, 1/fc represents the carrier cycle. Further, in FIG. 11, a waveform K1 represents a waveform of the carrier signal. Also, a waveform K2 represents a waveform of the voltage command value V*, and a waveform K3 represents a waveform of the U-phase voltage command value Vu*. A waveform K4 illustrated by a broken line represents a waveform of the V-phase voltage command value Vv* and the W-phase voltage command value Vw*. In the example in FIG. 11, the V-phase voltage command value Vv* and the W-phase voltage command value Vw* always show the same value. Furthermore, a waveform K5 represents a phase θ, and the value of the phase θ is switched over at the peak or valley of the carrier signal. Waveforms K6 to K8 represent the U-phase drive signal UP, the V-phase drive signal VP, and the W-phase drive signal WP, respectively. The respective pairs of drive signals, that is, the U-phase drive signal UP and the U-phase drive signal UN, the V-phase drive signal VP and the V-phase drive signal VN, and the W-phase drive signal WP and the W-phase drive signal WN, are in the opposite ones of the ON state and the OFF state, such that when the state of the one drive signal is identified, the state of the other drive signal is identified. Therefore, FIG. 11 illustrates only the respective ones of the drive signals, that is, the U-phase drive signal UP, the V-phase drive signal VP, and the W-phase drive signal WP. In FIG. 11, a dead time is not taken into consideration.

As illustrated in FIG. 11, when the U-phase drive signal UP, the V-phase drive signal VP, and the W-phase drive signal WP are changed, the voltage vector changes in the order: V0 (UP=VP=WP=0), V4 (UP=1 and VP=WP=0), V7 (UP=VP=WP=1), V3 (UP=0 and VP=WP=1), V0 (UP=VP=WP=0) . . . .

Figure 12:
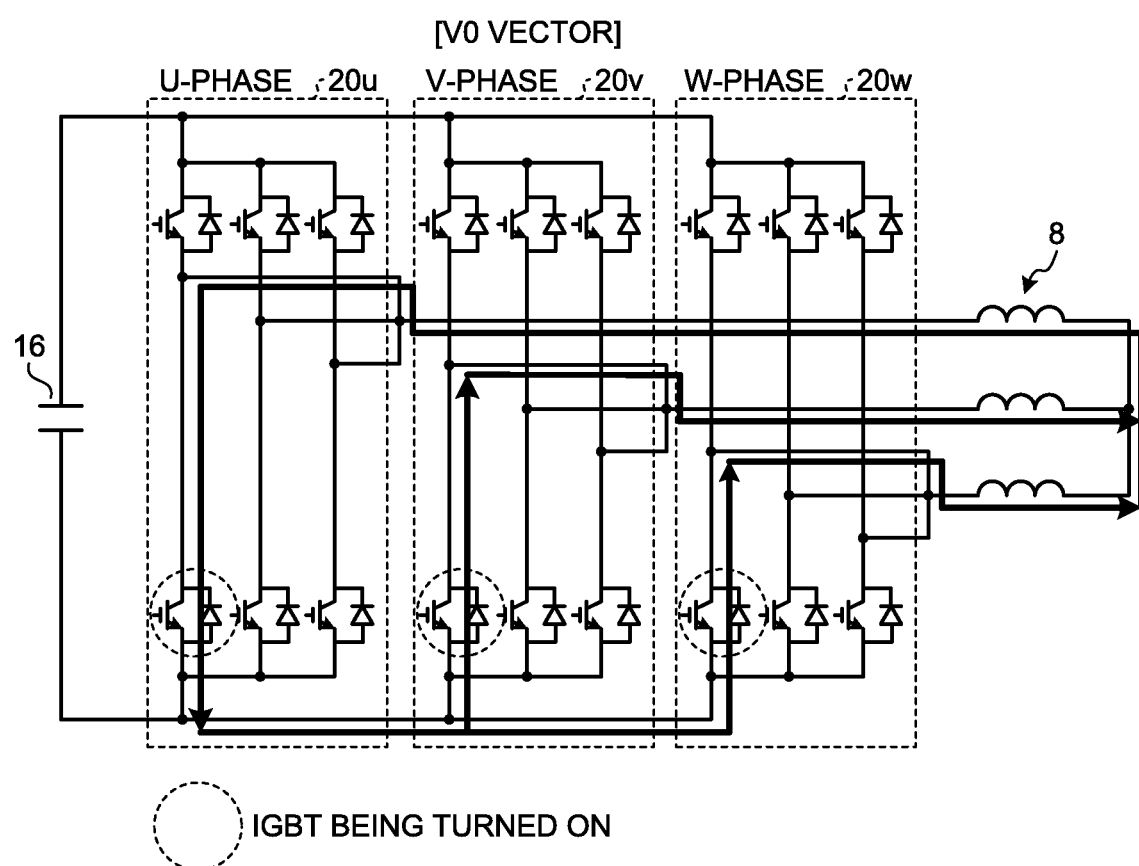
FIG. 12 is a diagram illustrating a current flow when a V0 vector is applied to the inverter device according to the first embodiment.

FIG. 12 is a diagram illustrating a current flow when the voltage vector V0 is applied (hereinafter, referred to as "V0 vector", and the same applies to the other voltage vectors). FIG. 12 illustrates a state in which the switching elements encircled with broken lines are ON, and the switching elements not encircled with the broken lines are OFF.

As illustrated in FIG. 12, when the V0 vector is applied, a motor current having flowed at the time of application of the immediately-previous voltage vector (the V3 vector in the example in FIG. 11) returns through the lower-arm elements. Since the current flows to the motor 8 in this manner even in a state in which no real vector is applied, the motor 8 can be heated efficiently.

Figure 13:
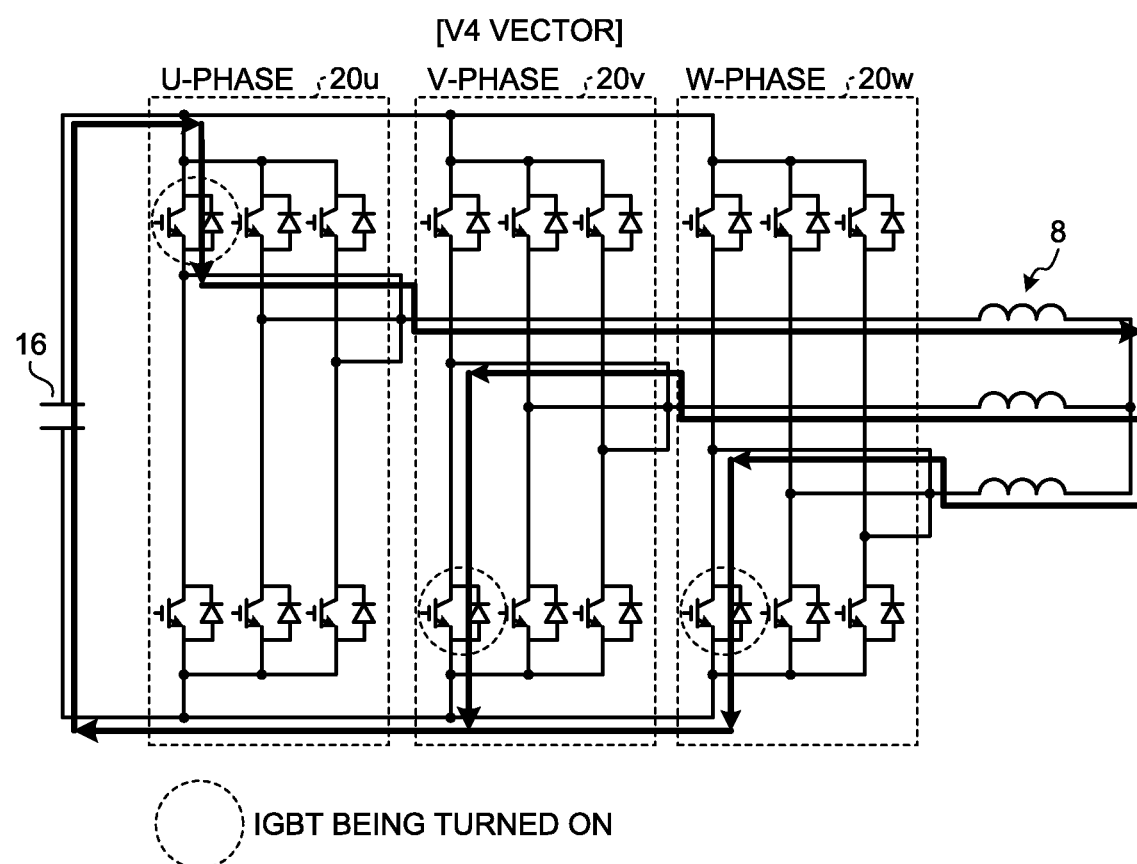
FIG. 13 is a diagram illustrating a current flow when a V4 vector is applied to the inverter device according to the first embodiment.

FIG. 13 is a diagram illustrating a current flow when the V4 vector is applied. When the V4 vector is applied, as illustrated in FIG. 13, the current flowing to the motor is supplied from the smoothing capacitor 16. The current supplied from the upper arm of the U-phase inverter 20*u* flows into the U-phase winding of the motor 8 and out from the V-phase winding and the W-phase winding of the motor 8, and returns to the smoothing capacitor 16 via the lower arms of the V-phase inverter 20*v* and the W-phase inverter 20*w*. Such a current can heat the motor 8.

Figure 14:
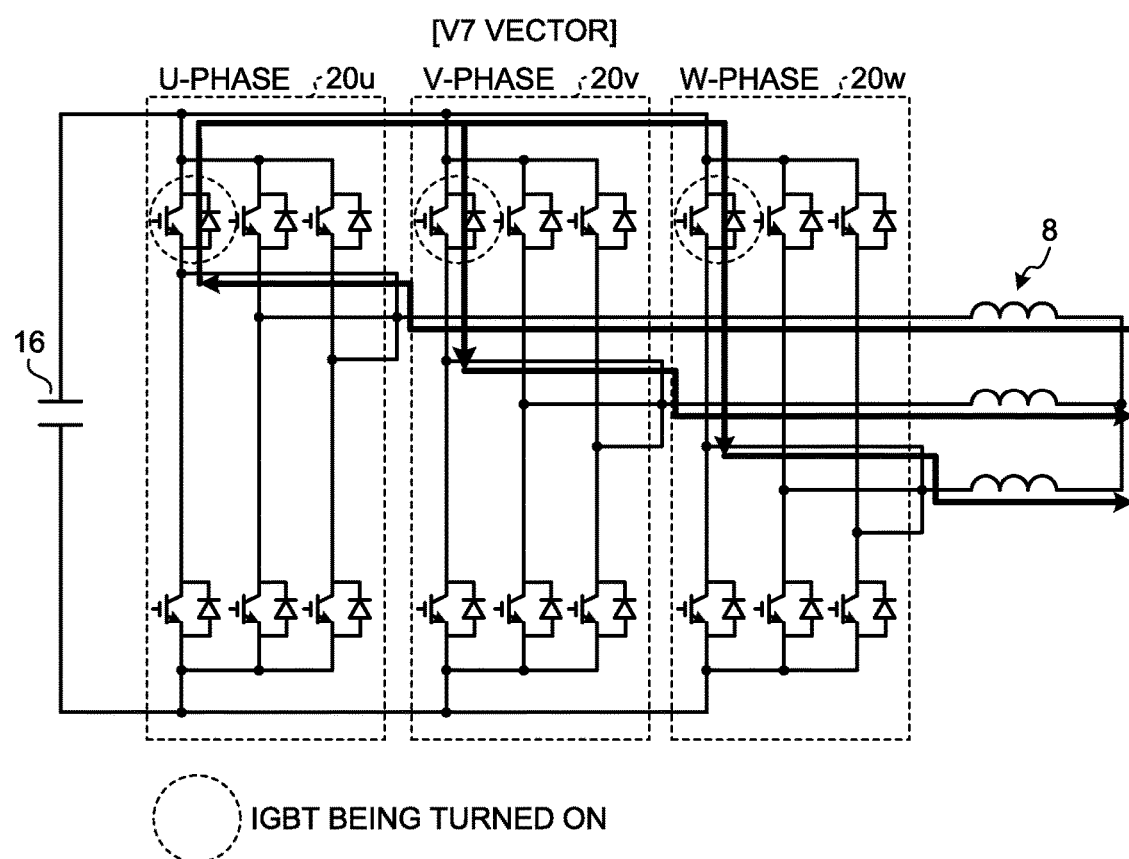
FIG. 14 is a diagram illustrating a current flow when a V7 vector is applied to the inverter device according to the first embodiment.

FIG. 14 is a diagram illustrating a current flow when the V7 vector is applied. When the V7 vector is applied, a motor current having flowed at the time of application of the immediately-previous voltage vector (the V4 vector in the example in FIG. 11) returns through the upper-arm elements, as illustrated in FIG. 14. Since the current flows to the motor 8 in this manner even in a state in which no real vector is applied, the motor 8 can be heated efficiently.

Figure 15:
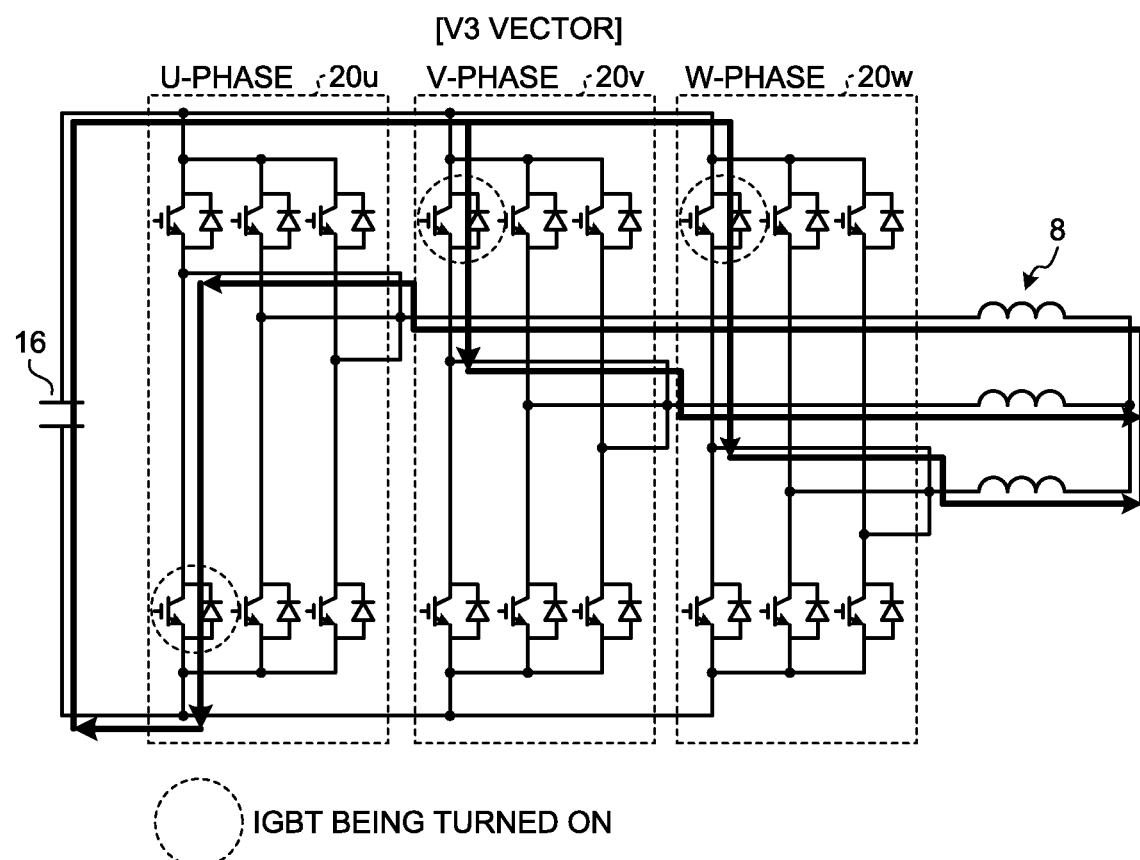
FIG. 15 is a diagram illustrating a current flow when a V3 vector is applied to the inverter device according to the first embodiment.

FIG. 15 is a diagram illustrating a current flow when the V3 vector is applied. When the V3 vector is applied, as illustrated in FIG. 15, the current flowing to the motor 8 is supplied from the smoothing capacitor 16. The current supplied from the upper arms of the V-phase inverter 20*v* and the W-phase inverter 20*w* flows into the V-phase winding and the W-phase winding of the motor 8 and out from the U-phase winding of the motor 8, and returns to the smoothing capacitor 16 via the lower arm of the U-phase inverter 20*u*. Such a current can heat the motor 8.

The above example shows the application of the voltage vector changing in the order: "V0→V4→V7→V3→V0 . . . ". However, a voltage vector changing in the order: "V0→V3→V7→V4→V0 . . . ", for example may be applied. In the compressing-operation mode, the inverter 20 in the first embodiment passes the current through all the switching elements connected in parallel. In the heating-operation mode, the inverter 20 passes the current through only one of the switching elements connected in parallel. Therefore, as compared to the case where an inverter having the switching elements not connected in parallel is used, the current flowing in the heating-operation mode increases and the smooth current commutation at the time of ON/OFF switching during the change from the zero vector to the real vector is achieved, thereby suppressing the occurrence of the output-voltage distortion.

Further, the above example shows the case where the V-phase voltage command value Vv* and the W-phase voltage command value Vw* always have the same value. However, the U-phase voltage command value Vu* and the W-phase voltage command value Vw* may be controlled to always have the same value, in which case the V2 vector and the V5 vector can be applied as the real vectors. Furthermore, the U-phase voltage command value Vu* and the V-phase voltage command value Vv* may be controlled to always have the same value, in which case the V1 vector and the V6 vector can be applied as the real vectors.

Figure 16:
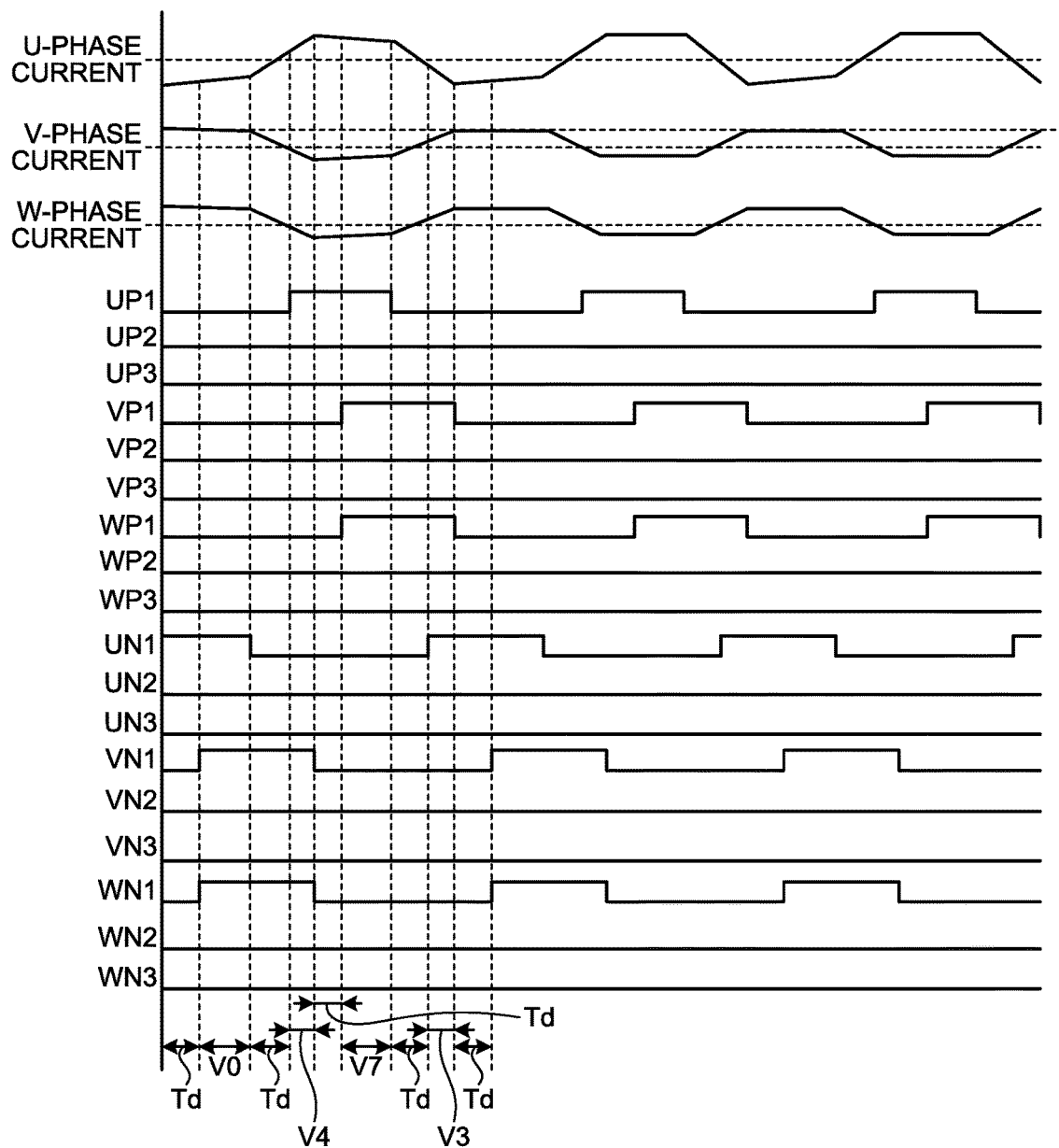
FIG. 16 is a diagram illustrating an example of an operating waveform when the inverter device is driven by applying a voltage vector in the order illustrated in FIG. 11.

FIG. 16 is a diagram illustrating an example of the operating waveform when the inverter device is driven by applying a voltage vector in the order illustrated in FIG. 11. FIG. 16 illustrates the case as an example where only a single arm in each phase is operated and the two other arms are not operated. For example, in the U-phase, only UP1 and UN1 are output, while UP2, UN2, UP3, and UN3 are not output. The same applies to the V-phase and the W-phase. VP1, VN1, WP1, and WN1 are only output, while VP2, VN2, VP3, VN3, WP2, WN2, WP3, and WN3 are not output. In FIG. 16, a dead time is taken into consideration. A dead-time section is represented by Td.

The upper section of FIG. 16 illustrates the waveforms of the U-phase current, the V-phase current, and the W-phase current that flow through the motor 8. As will be appreciated, these currents flow continuously even in the dead-time section, such that the heating operation is performed effectively. Although FIG. 16 illustrates the case as an example where only the single arm is operated, it will be appreciated that the other arms can be operated.

Figure 17:
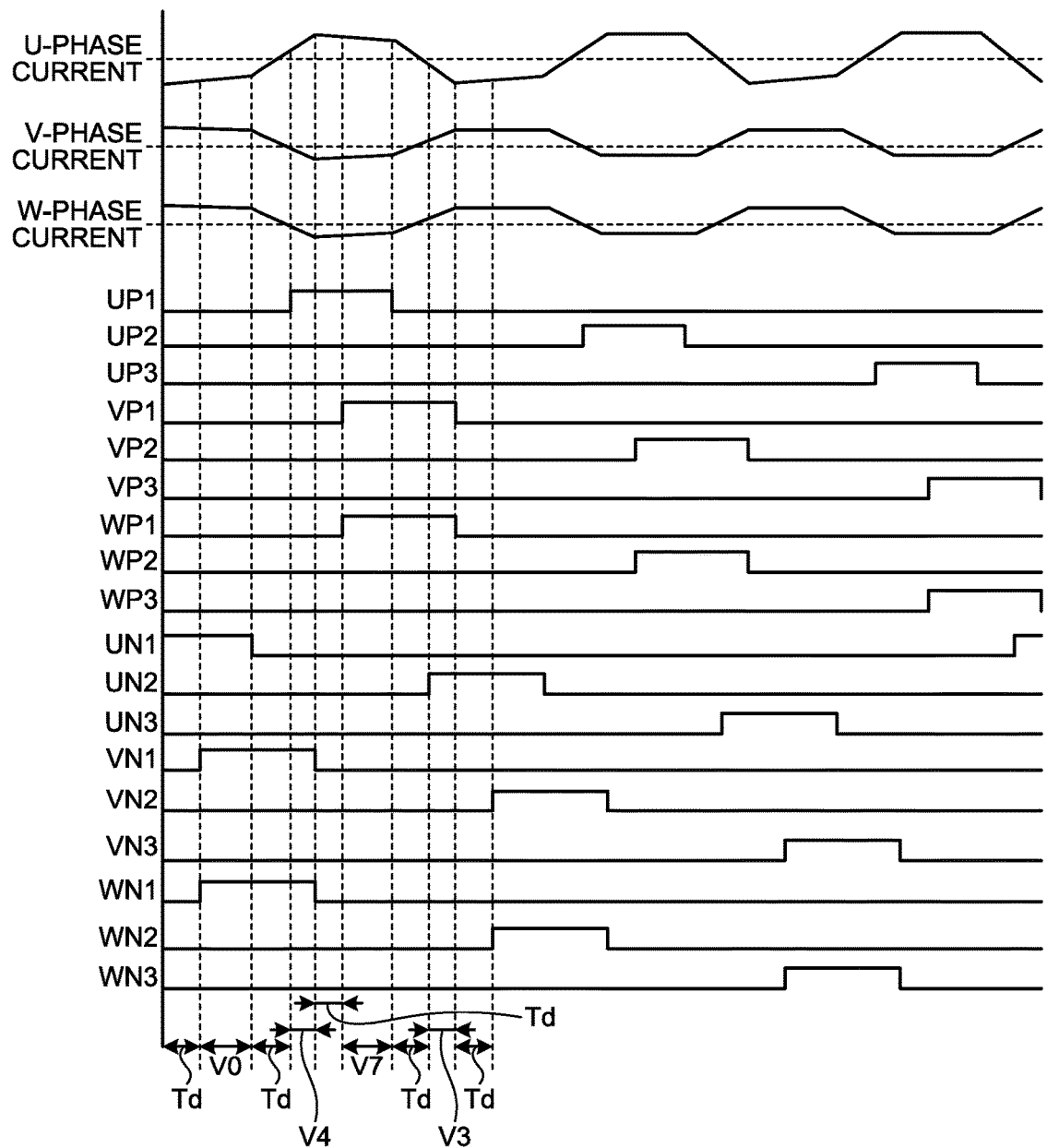
FIG. 17 is a diagram illustrating an example of an operating waveform when the inverter device is driven in accordance with a set sequence different from that in FIG. 16.

FIG. 17 is a diagram illustrating an example of the operating waveform when the arm to perform the ON operation is switched in accordance with the set sequence. The upper section of FIG. 17 illustrates the waveforms of the U-phase current, the V-phase current, and the W-phase current that flow through the motor 8. The illustrated current waveforms, which are the same as those in FIG. 16 when only the single arm is operated, enables the effective heating operation. Operating the arms in rotation without operating the fixed arms suppresses an uneven increase in temperature increase among the switching elements. The suppression of the uneven temperature increase equalizes the lives of the switching elements, thereby improving the reliability of the device. The arm to perform the ON operation may be switched randomly rather than in accordance with the set sequence.

Although not illustrated in FIG. 2 etc., a temperature sensor for measuring the temperature of the switching element may be provided. When the temperature sensor is provided, the switching element to be operated can be selected depending upon the estimated temperature of the switching element. When an arm with a low-estimated-temperature switching element is selected as the arm to be operated, the uneven increase in temperature among the switching elements can be suppressed. In that case, a pair of switching elements of the same arm should be not necessarily selected as the operating pair. For example, in the U-phase inverter 20*u* illustrated in FIG. 2, when the switching element 18*up*1 is operated, the switching element 18*un*2 or the switching element 18*un*3 of the different arm may be selected as the operating pair.

Next, a discussion is made as to the switching elements used in the inverter 20. As described above, when the switching elements are mounted as chips, the smaller chip area improves the yield in the removal from the wafer. This is a matter that does not depend on the material of the switching element. The switching element of the inverter may therefore use any material.

Wide bandgap semiconductors such as GaN (gallium nitride), SiC (silicon carbide), and diamond, has been attracting attention in the recent technical trends as high-withstand-voltage low-loss elements capable of operating at high-currents, high-temperatures, and high-frequencies. When the inverter is configured by using the wide bandgap semiconductor, the inverter is capable of operating particularly at a high temperature. Further, The wide bandgap semiconductor, which is the high-voltage low-loss element, is the material suitable for simplification and reduction in weight of the configuration of a power conversion device including a cooler.

A wafer is very costly for a switching element using the wide bandgap semiconductor. SiC and other materials often have crystal defects. Therefore, there is a higher demand to decrease the chip area for wide bandgap semiconductors than for narrow bandgap semiconductors such as Si. The parallel configuration having the low-current-capacity switching elements connected in parallel is preferable in configuring the inverter using the wide bandgap semiconductor.

As described above, the inverter of the heat pump apparatus according to the first embodiment is configured to include the same number of the bridge circuits as the number of the phases of the motor, the bridge circuits each having the plural paralleled-connected pairs of series-connected switching elements. Such an inverter can thus use the low-current-capacity switching elements, thereby improving the yield of the wafer.

Further, since the heat pump apparatus according to the first embodiment controls some pairs of switching elements among the plural pairs of switching elements in the heating-operation mode, the high-frequency heating can still be performed effectively even on the compressor driven by the inverter configured to use the parallel-connected low-current-capacity switching elements.

Furthermore, the inverter of the heat pump apparatus according to the first embodiment uses the low-current-capacity switching elements, thereby accommodating the difference in the output current between the compressing operation and the heating operation, such that the inverter is highly efficiently driven.

Second Embodiment

In a second embodiment, one example of a circuit configuration of the heat pump apparatus 100 is explained. For example, FIG. 1 and the like illustrate the heat pump apparatus 100 in which the compressor 1, the four-way valve 2, the heat exchanger 3, the expansion mechanism 4, and the heat exchanger 5 are sequentially connected by piping. In the second embodiment, the heat pump apparatus 100 having a more specific configuration is explained.

Figure 18:
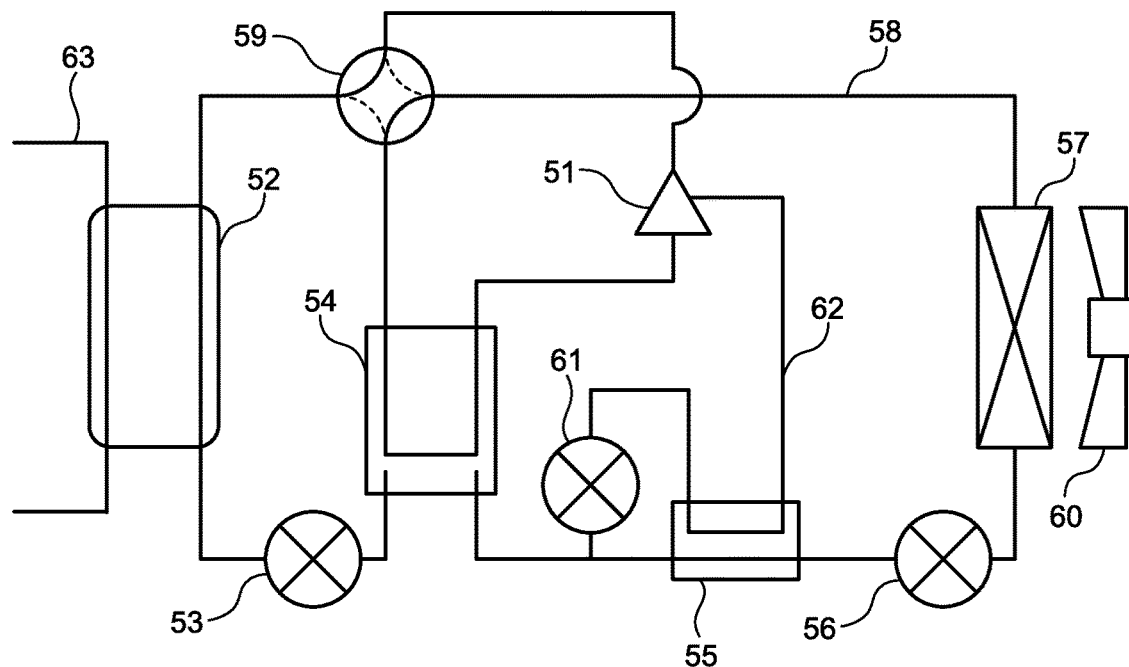
FIG. 18 is a circuit configuration diagram of a heat pump apparatus according to a second embodiment.
Figure 19:
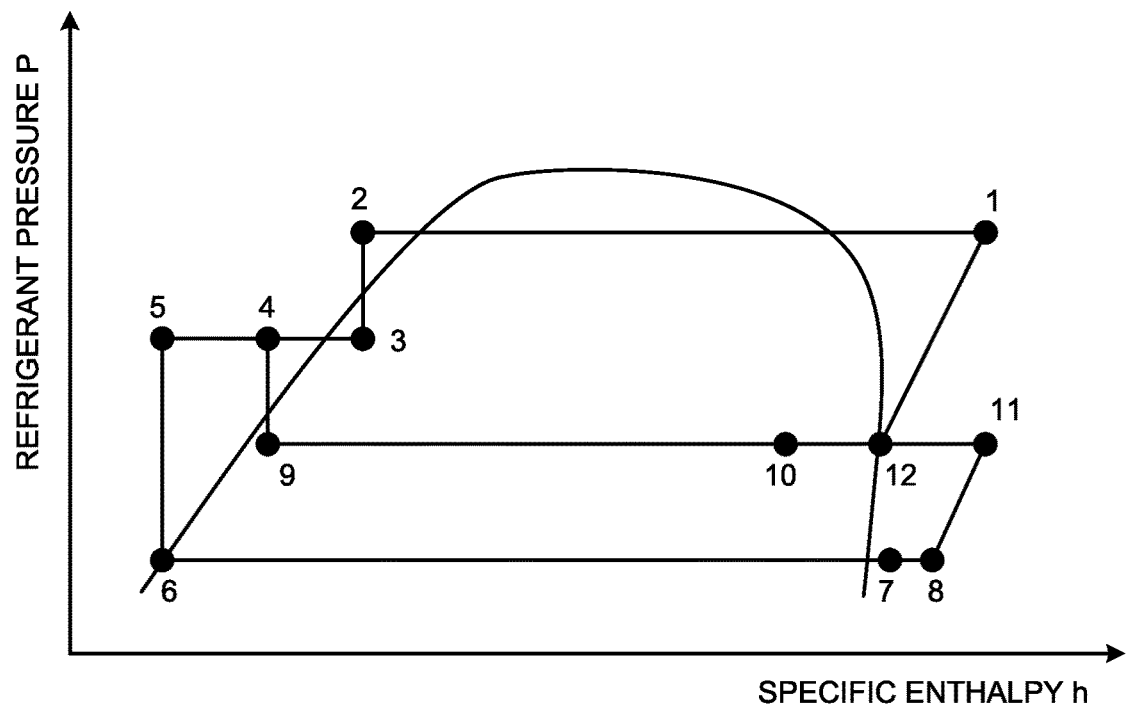
FIG. 19 is a Mollier diagram of a state of a refrigerant of the heat pump apparatus illustrated in FIG. 18.

FIG. 18 is a circuit configuration diagram of the heat pump apparatus 100 according to the second embodiment. FIG. 19 is a Mollier diagram of a state of the refrigerant of the heat pump apparatus 100 illustrated in FIG. 18. In FIG. 19, a specific enthalpy is indicated on a horizontal axis, and a refrigerant pressure is indicated on a vertical axis.

In the heat pump apparatus 100, a compressor 51, a heat exchanger 52, an expansion mechanism 53, a receiver 54, an internal heat exchanger 55, an expansion mechanism 56, and a heat exchanger 57 are sequentially connected by piping, and the heat pump apparatus 100 includes a main refrigerant circuit 58 through which the refrigerant circulates. In the main refrigerant circuit 58, a four-way valve 59 is provided on a discharge side of the compressor 51 for switching a direction of circulation of the refrigerant. A fan 60 is provided near the heat exchanger 57. The compressor 51, which is the compressor 1 explained in the embodiment described above, includes the motor 8 driven by the inverter device 9 and the compression mechanism 7. Furthermore, the heat pump apparatus 100 includes an injection circuit 62 connecting from between the receiver 54 and the internal heat exchanger 55 to an injection pipe of the compressor 51 by the piping. An expansion mechanism 61 and the internal heat exchanger 55 are sequentially connected to the injection circuit 62.

A water circuit 63 in which water is circulated is connected to the heat exchanger 52. A device that uses water from a hot water dispenser, a radiator, a radiator for floor heating, or the like is connected to the water circuit 63.

First, an operation of the heat pump apparatus 100 at the time of the heating operation is explained. At the time of the heating operation, the four-way valve 59 is set in a direction of a solid line. The heating operation includes not only heating used for air conditioning but also hot-water supply for applying heat to water to make hot water.

A gas-phase refrigerant (at a point 1 in FIG. 19), which has become a refrigerant having a high temperature and pressure in the compressor 51, is discharged from the compressor 51, and is liquefied (at a point 2 in FIG. 19) by effecting heat exchange at the heat exchanger 52 that is a condenser and a radiator. At this time, water circulating in the water circuit 63 is heated by heat radiated from the refrigerant, and used for heating and hot-water supply.

The liquid-phase refrigerant liquefied at the heat exchanger 52 is reduced in pressure by the expansion mechanism 53, and becomes a gas-liquid two-phase state (at a point 3 in FIG. 19). The refrigerant, which has become the gas-liquid two-phase state in the expansion mechanism 53, effects heat exchange with the refrigerant sucked into the compressor 51 by the receiver 54, and is cooled and liquefied (at a point 4 in FIG. 19). The liquid-phase refrigerant liquefied by the receiver 54 flows such that the liquid-phase refrigerant is branched to the main refrigerant circuit 58 and the injection circuit 62.

The liquid-phase refrigerant flowing in the main refrigerant circuit 58 is further cooled (at a point 5 in FIG. 19) by effecting, at the internal heat exchanger 55, heat exchange with the refrigerant which is reduced in pressure by the expansion mechanism 61 into the gas-liquid two-phase state and flows in the injection circuit 62. The liquid-phase refrigerant cooled by the internal heat exchanger 55 is reduced in pressure by the expansion mechanism 56 into the gas-liquid two-phase state (at a point 6 in FIG. 19). The refrigerant, which has become the gas-liquid two-phase state in the expansion mechanism 56, is heated (at a point 7 in FIG. 19) by effecting heat exchange with ambient air at the heat exchanger 57 that is an evaporator. The refrigerant heated by the heat exchanger 57 is further heated by the receiver 54 (at a point 8 in FIG. 19), and is sucked into the compressor 51.

On the other hand, as described above, the refrigerant flowing in the injection circuit 62 is reduced in pressure by the expansion mechanism 61 (at a point 9 in FIG. 19), and effects heat exchange (at a point 10 in FIG. 19) at the internal heat exchanger 55. A refrigerant (injection refrigerant) in the gas-liquid two-phase state, which has effected heat exchange at the internal heat exchanger 55, flows into the compressor 51 from the injection pipe of the compressor 51 as the injection refrigerant maintains the gas-liquid two-phase state.

In the compressor 51, the refrigerant sucked in from the main refrigerant circuit 58 (at the point 8 in FIG. 19) is compressed up to an intermediate pressure and heated (at a point 11 in FIG. 19). The injection refrigerant (at the point 10 in FIG. 19) joins the heated refrigerant compressed to the intermediate pressure (at the point 11 in FIG. 19), thereby decreasing the temperature (at a point 12 in FIG. 19). The refrigerant having the decreased temperature (at the point 12 in FIG. 19) is further compressed and heated to have a high temperature and pressure, and is discharged (at the point 1 in FIG. 19).

When the injection operation is not performed, the degree of opening of the expansion mechanism 61 is fully closed. That is, when the injection operation is performed, the degree of opening of the expansion mechanism 61 is larger than a predetermined degree of opening. However, when the injection operation is not performed, the degree of opening of the expansion mechanism 61 is set to be smaller than the predetermined degree of opening. Accordingly, the refrigerant does not flow into the injection pipe of the compressor 51. The degree of opening of the expansion mechanism 61 then is controlled by electronic control by a control unit such as a microcomputer.

Next, the operation of the heat pump apparatus 100 at the time of a cooling operation is explained. At the time of the cooling operation, the four-way valve 59 is set in a direction of a broken line. The cooling operation includes not only cooling used for air conditioning, but also drawing heat from water to make cold water, refrigeration, and the like.

The gas-phase refrigerant (at the point 1 in FIG. 19), which has become a refrigerant having a high temperature and pressure in the compressor 51, is discharged from the compressor 51, and is liquefied (at the point 2 in FIG. 19) by effecting heat exchange at the heat exchanger 57 that is the condenser and the radiator. The liquid-phase refrigerant liquefied at the heat exchanger 57 is reduced in pressure by the expansion mechanism 56 into a gas-liquid two-phase state (at the point 3 in FIG. 19). The refrigerant, which has become the gas-liquid two-phase state in the expansion mechanism 56, is cooled into liquid (at the point 4 in FIG. 19) by effecting heat exchange at the internal heat exchanger 55. In the internal heat exchanger 55, the refrigerant, which has become the gas-liquid two-phase state in the expansion mechanism 56, effects heat exchange with the refrigerant (the point 9 in FIG. 19) having become the gas-liquid two-phase state by the expansion mechanism 61 reducing the pressure of the liquid-phase refrigerant liquefied at the internal heat exchanger 55. The liquid-phase refrigerant (the point 4 in FIG. 19), which has effected the heat exchange at the internal heat exchanger 55, flows such that the liquid-phase refrigerant is branched to the main refrigerant circuit 58 and the injection circuit 62.

The liquid-phase refrigerant flowing in the main refrigerant circuit 58 is further cooled (at the point 5 in FIG. 19) by effecting heat exchange with the refrigerant sucked into the compressor 51 by the receiver 54. The liquid-phase refrigerant cooled at the receiver 54 is reduced in pressure into the gas-liquid two-phase state (at the point 6 in FIG. 19) by the expansion mechanism 53. The refrigerant, which has become the gas-liquid two-phase state in the expansion mechanism 53, is heated (at the point 7 in FIG. 19) by effecting heat exchange at the heat exchanger 52 that is the evaporator. At this time, since the refrigerant absorbs heat, water circulating in the water circuit 63 is cooled and used for cooling and refrigeration. The refrigerant heated by the heat exchanger 52 is further heated by the receiver 54 (at the point 8 in FIG. 19), and is sucked into the compressor 51.

On the other hand, the refrigerant flowing in the injection circuit 62 is reduced in pressure (at the point 9 in FIG. 19) at the expansion mechanism 61 as described above, and effects heat exchange (at the point 10 in FIG. 19) at the internal heat exchanger 55. A refrigerant (injection refrigerant) in the gas-liquid two-phase state, which has effected the heat exchange at the internal heat exchanger 55, flows in from the injection pipe of the compressor 51 as the injection refrigerant maintains the gas-liquid two-phase state. The compression operation in the compressor 51 is the same as that of the heating operation.

When the injection operation is not performed, as in the heating operation, the degree of opening of the expansion mechanism 61 is fully closed to prevent the refrigerant from flowing into the injection pipe of the compressor 51.

In the above explanations, the heat exchanger 52 has been explained as a heat exchanger like a plate type heat exchanger that allow the heat exchange between the refrigerant and the water circulating in the water circuit 63. However, the heat exchanger 52 is not limited thereto, and may be other types of heat exchangers allowing the heat exchange between the refrigerant and air. Further, the water circuit 63 may not be a circuit in which water is circulated, but may be a circuit in which another type of fluid is circulated.

As described above, the heat pump apparatus 100 can be used for the heat pump apparatus using the inverter compressor, such as an air conditioner, a heat pump water heater, a refrigerator, a freezer, and the like.

The configurations described in the first and second embodiments are only examples of the contents of the present invention. These configurations can be combined with other publicly known techniques, and a part of the configurations can be omitted or modified without departing from the scope of the present invention.

The invention claimed is:
1. A heat pump apparatus comprising:
a compressor compressing a refrigerant;
a motor driving the compressor;
an inverter including a bridge circuit equal in number to a phase of the motor, the bridge circuit including plural pairs of switching elements formed of wide bandgap semiconductors, the switching elements being connected in series, the plural pairs of switching elements being connected in parallel, the inverter applying to the motor a high-frequency voltage of a frequency at which the motor does not rotate; and
an inverter control unit controlling the inverter,
wherein during a compressing-operation mode causing the compressor to compress a refrigerant, the inverter control unit causes the inverter to generate an AC voltage of a frequency at which the motor rotates, and during a heating-operation mode heating the compressor, the inverter control unit causes the inverter to generate the high-frequency voltage,
wherein in the heating-operation mode, the inverter control unit controls at least one pair of switching elements among the plural pairs of switching elements,
wherein the inverter control unit switches the pair of switching elements to be switching-controlled in accordance with a set sequence within a bridge circuit.
2. An air conditioner comprising the heat pump apparatus according to claim 1.
3. A heat pump water heater comprising the heat pump apparatus according to claim 1.
4. A refrigerator comprising the heat pump apparatus according to claim 1.
5. A heat pump apparatus comprising:
a compressor compressing a refrigerant;
a motor driving the compressor;
an inverter including a bridge circuit equal in number to a phase of the motor, the bridge circuit including plural pairs of switching elements formed of wide bandgap semiconductors, the switching elements being connected in series, the plural pairs of switching elements being connected in parallel, the inverter applying to the motor a high-frequency voltage of a frequency at which the motor does not rotate; and
an inverter control unit controlling the inverter,
wherein during a compressing-operation mode causing the compressor to compress a refrigerant, the inverter control unit causes the inverter to generate an AC voltage of a frequency at which the motor rotates, and during a heating-operation mode heating the compressor, the inverter control unit causes the inverter to generate the high-frequency voltage, wherein in the heating-operation mode, the inverter control unit controls at least one pair of switching elements among the plural pairs of switching elements, wherein the inverter control unit randomly switches the pair of switching elements to be switching-controlled within a bridge circuit.

6. A heat pump apparatus comprising:

a compressor compressing a refrigerant;

a motor driving the compressor;

an inverter including a bridge circuit equal in number to a phase of the motor, the bridge circuit including plural pairs of switching elements formed of wide bandgap semiconductors, the switching elements being connected in series, the plural pairs of switching elements being connected in parallel, the inverter applying to the motor a high-frequency voltage of a frequency at which the motor does not rotate; and an inverter control unit controlling the inverter, wherein during a compressing-operation mode causing the compressor to compress a refrigerant, the inverter control unit causes the inverter to generate an AC voltage of a frequency at which the motor rotates, and during a heating-operation mode heating the compressor, the inverter control unit causes the inverter to generate the high-frequency voltage, wherein in the heating-operation mode, the inverter control unit controls at least one pair of switching elements among the plural pairs of switching elements, wherein the inverter control unit determines the pair of switching elements to be switching-controlled on a basis of a temperature of the switching element.

7. The heat pump apparatus according to claim 6, wherein the wide bandgap semiconductor is made from silicon carbide, a gallium nitride material, or diamond.

* * * * *